(12) United States Patent
Nakajima

(10) Patent No.: US 6,796,491 B2
(45) Date of Patent: Sep. 28, 2004

(54) ELECTRONIC PAYMENT SYSTEM, PAYMENT APPARATUS AND TERMINAL THEREOF

(76) Inventor: Keiichi Nakajima, c/o NTI International Ltd., 52-6, Nishi-Nippori 1-chome, Arakawa-ku, Tokyo (JP)

( * ) Notice: Subject to any disclaimer, the term of this patent is extended or adjusted under 35 U.S.C. 154(b) by 0 days.

(21) Appl. No.: 10/063,102

(22) Filed: Mar. 20, 2002

(65) Prior Publication Data

US 2002/0130175 A1 Sep. 19, 2002

Related U.S. Application Data

(63) Continuation of application No. PCT/JP99/05219, filed on Sep. 22, 1999.

(51) Int. Cl.[7] .............................................. G06F 17/60
(52) U.S. Cl. ...................................... 235/379; 235/380
(58) Field of Search ................................ 235/379, 380, 235/381, 382; 705/39, 41, 42, 43, 44

(56) References Cited

U.S. PATENT DOCUMENTS

| | | | |
|---|---|---|---|
| 5,650,604 A | * 7/1997 | Marcous et al. | 235/379 |
| 5,659,165 A | * 8/1997 | Jennings et al. | 235/379 |
| 5,696,827 A | * 12/1997 | Brands | 380/30 |
| 5,745,886 A | * 4/1998 | Rosen | 235/375 |
| 5,949,044 A | * 9/1999 | Walker et al. | 235/379 |
| 6,488,203 B1 | * 12/2002 | Stoutenburg et al. | 235/379 |

OTHER PUBLICATIONS

Department of Justice Canada, Solicitor General Canada, "Electronic Money Laundering: An Environmental Scan", Oct. 1998, pp 1–3 and 19–20.

* cited by examiner

Primary Examiner—Daniel St. Cyr
(74) Attorney, Agent, or Firm—Pillsbury Winthrop LLP

(57) ABSTRACT

An electronic payment system for making electronic money payments for transactions. A payment terminal stores a balance of electronic money for payment on a dealing by electronic money. A demanding terminal communicates with the payment terminal to demand the payment and a payment apparatus communicates with the demanding terminal and stores a balance of electronic money to correspond to an identification number of the payment terminal for allowing settlement on the dealing. The demanding terminal receives from the payment terminal the balance stored in the payment terminal and transmits the balance to the payment apparatus. The payment apparatus detects an improper use by checking the balance stored in the payment terminal, which was received from the demanding terminal, with the balance stored in the payment apparatus. The system of the present invention provides secure and convenient electronic money payment for a user's transaction.

23 Claims, 30 Drawing Sheets

| n:TIME THAT HAS PASSED (MIN.) OR THE NUMBER OF USES | $\sqrt{2}$ | $\sqrt{3}$ | $\sqrt{5}$ | $\sqrt{6}$ | ← INITIAL VALUE |
|---|---|---|---|---|---|
| | n-TH DECIMAL PLACE NUMBER | | | | |
| 1 | 4 | 7 | 2 | 4 | |
| 2 | 1 | 3 | 3 | 4 | |
| 3 | 4 | 2 | 6 | 9 | |
| 4 | 2 | 0 | 2 | 4 | |
| • | • | • | • | • | |
| •<br>•<br>• | LOOP OF 20 FIGURES | LOOP OF 30 FIGURES | LOOP OF 50 FIGURES | LOOP OF 60 FIGURES | |

*FIG. 12*

| TIME THAT HAS PASSED (MIN.) OR THE NUMBER OF USES | 2 | 7 | 4 | 1 | ← INITIAL VALUE |
|---|---|---|---|---|---|
| 1 | 1 | 2 | 6 | 4 | |
| 2 | 2 | 3 | 7 | 5 | |
| 3 | 1 | 4 | 6 | 8 | |
| 4 | 9 | 7 | 3 | 4 | |
| ⋮ | ⋮ | ⋮ | ⋮ | ⋮ | |

(a)

PAYMENT CANNOT
BE MADE BECAUSE
OF FAILURE OF CHECK.

[ OK ]

(b)

PAYMENT CANNOT BE
MADE BECAUSE OF
SHORTAGE OF BALANCE.

[ OK ]

(c)

YOU CANNOT PAY
BY E-MONEY.

[ OK ]

(d)

YOU HAVE CANCELLED
PAYMENT.

[ OK ]

(e)

E-MONEY OK
TOTAL OF
PURCHASE : ¥25,456
TAX      : ¥ 1,272
TOTAL OF
PAYMENT  : ¥26,728
PAYMENT HAS BEEN
COMPLETED.

FIG. 26

(a)
```
BOARDING STATION:
○○LINE STATION A
                    932
```

(b)
```
YOU CANNOT PAY BY
  E-MONEY BECAUSE OF
SHORTAGE OF BALANCE.
```

(c)
```
AUGUST 10, 1999
AM 11:00
                    932
```

(d)
```
○○LINE
STATION A-STATION B
FARE :      ¥220
BALANCE : ¥5,620
```

(e)
```
BOARDING STATION:
○○LINE STATION A
```

(f)
```
○○LINE
STATION A-STATION B
FARE: ¥220

YOUR BALANCE DOES
  NOT COVER FARE.
```

FIG. 32

ELECTRONIC PAYMENT SYSTEM, PAYMENT APPARATUS AND TERMINAL THEREOF

CROSS REFERENCE TO RELATED APPLICATIONS

This is a continuation application of PCT/JP99/05219 filed in Japan on Sep. 22, 1999, the contents of which are incorporated herein by reference.

BACKGROUND OF INVENTION

1. Field of the Invention

The present invention relates to an electronic payment system, a payment apparatus and terminals thereof for electronic money transactions or financial dealings. More particularly, the present invention relates to processing payments by electronic money by validating the payments to prevent improper and fraudulent use.

2. Description of the Related Art

In a conventional electronic payment system in which the payments on dealings are made by electronic money, there are possibilities of falsification and unfair use of the electronic money. Thus, the system was configured to use an improved encryption technique in order to prevent the disclosure of information regarding the electronic money, or to record the information regarding the electronic money on an IC (integrated circuit) card so as to allow the use and deposit of the electronic money only via an exclusive IC card reader.

The conventional electronic payment system using electronic money, described above, has a problem in that the exclusive IC card reader or a complicated authentication and encryption procedure is required so as to enhance security in order to prevent the falsification and unfair use of the electronic money, thus giving up the convenience of electronic money.

SUMMARY OF INVENTION

Therefore, it is an object of the present invention to provide a safe and convenient electronic payment system using electronic money, which is capable of overcoming the above drawbacks accompanying the conventional art. The above and other objects can be achieved by combinations described in the independent claims. The dependent claims define further advantageous and exemplary combinations of the present invention.

According to a first aspect of the present invention, an electronic payment system that makes electronic money payment relating to a dealing, comprises: a payment terminal operable to store a first balance of electronic money for the electronic money payment relating to the dealing; a demanding terminal operable to communicate with the payment terminal to demand the payment; and a payment apparatus operable to communicate with the demanding terminal and to store a second balance of electronic money to correspond to an identification number of the payment terminal for validating the payment, wherein the demanding terminal receives from the payment terminal the first balance stored in the payment terminal and transmits the first balance to the payment apparatus, and the payment apparatus detects unfair use of the electronic money by checking the first balance stored in the payment terminal, which was received from the demanding terminal, with the second balance stored in the payment apparatus.

According to a second aspect of the present invention, an electronic payment system for making payment on a dealing by electronic money, comprises: a payment terminal operable to store a first reference number for electronic money for making payment on the dealing by the electronic money; a demanding terminal operable to communicate with the payment terminal to demand the payment; and a payment apparatus operable to communicate with the demanding terminal and to store a second reference number to correspond to an identification number of the payment terminal for allowing settlement of the payment on the dealing, wherein the payment apparatus updates the second reference number in accordance with a predetermined update rule, the payment terminal receives the update rule of the second reference number from the payment apparatus and updates the first reference number in accordance with the update rule, and in a case where the demanding terminal received from the payment terminal the first reference number stored in the payment terminal and then transmitted the first reference number to the payment apparatus, the payment apparatus checks the first reference number, received from the demanding terminal, with the second reference number stored in the payment apparatus to detect unfair use of the electronic money.

According to a third aspect of the present invention, a payment apparatus that communicates with a payment terminal and a demanding terminal to make settlement on an electronic money payment for a dealing, the payment terminal being operable to store an electronic money balance for making payment on the dealing by the electronic money, the demanding terminal being operable to demand the payment on the dealing, the payment apparatus comprises: a memory unit operable to store a check balance of the electronic money to correspond to an identification number of the payment terminal; a communication unit operable to receive, from the demanding terminal, a payment amount of the electronic money to be paid by the payment terminal; and a processor operable to update the check balance of the electronic money stored in the memory unit based on the payment amount received from the demanding terminal.

In a case where the communication unit received from the payment terminal a deposit-requested amount of the electronic money, the processor may update the check balance stored in the memory unit based on the deposit-requested amount, and the communication unit may transmit a new balance, obtained by the update, to the payment terminal.

The communication unit may receive the electronic money balance for making payment on the dealing, when the deposit-requested amount of the electronic money is received from the payment terminal, and the processor may compare the electronic money balance the communication unit received from the payment terminal with the check balance stored in the memory unit, may transmit the new balance to the communication unit when the compared balances coincide, and may notify a manager of the payment apparatus of a warning indicating a possibility of unfair use when the compared balances do not coincide.

The communication unit may receive from the demanding terminal the electronic money balance for making payment on the dealing, which is notified from the payment terminal, when the communication unit receives, from the demanding terminal, the payment amount to be paid by the payment terminal, and the processor may compare the electronic money balance the communication unit received from the demanding terminal with the check balance stored in the memory unit, may update the check balance stored in the memory unit when the compared balances coincide, and may notify a manager of the payment apparatus of a warning indicating a possibility of unfair use when the compared balances do not coincide.

In a case where the communication unit received a balance inquiry request from the payment terminal together with the electronic money balance for making payment on the dealing, the processor may compare the electronic money balance the communication unit received from the payment terminal with the check balance stored in the memory unit, and may transmit a warning indicating a possibility of unfair use when the compared balances do not coincide.

The communication unit may transmit a balance inquiry request to the payment terminal and may receive the electronic money balance for making payment on the dealing from the payment terminal, and the processor may compare the electronic money balance the communication unit received from the payment terminal with the check balance stored in the memory unit, and may notify a manager of the payment apparatus of a warning indicating a possibility of unfair use when the compared balances do not coincide.

The memory unit may store a term of validity in relation to the electronic money, and in a case where the communication unit received the payment amount of the electronic money from the demanding terminal, the processor may not update the check balance of the electronic money stored in the memory unit based on the payment amount, and may notify a manager of the payment apparatus of a warning indicating a possibility of unfair use, when a time that has passed after a start time, at which the communication unit transmitted, to the payment terminal, the new balance of the electronic money based on the deposit-requested amount, has gone beyond the term of validity.

The memory unit may store an update time in relation to the electronic money at which the check balance of the electronic money was last updated based on a previous payment amount, and in a case where the communication unit received the payment amount from the demanding terminal, the processor may not update the check balance of the electronic money when a predetermined time has not passed after the update time based on the previous payment amount.

According to a fourth aspect of the present invention, a payment apparatus that communicates with a payment terminal and a demanding terminal to make settlement on an electronic money payment for a dealing, the payment terminal being operable to store a check reference number for the electronic money for making payment on the dealing, the demanding terminal being operable to demand the payment on the dealing, the payment apparatus comprises: a memory unit operable to store a reference number of the electronic money to correspond to an identification number of the payment terminal; an operation unit operable to update the reference number in accordance with a predetermined update rule; a communication unit operable to receive, from the demanding terminal, the check reference number of the electronic money, which the demanding terminal was notified from the payment terminal; and a processor operable to compare the reference number stored in the memory unit with the check reference number received from the demanding terminal to validate the electronic money.

In a case where the communication unit received a deposit request for the electronic money from the payment terminal, the communication unit transmits the update rule for updating the reference number to the payment terminal. The update rule may uniquely determine the reference number based on an initial value and time information to provide different reference numbers for different initial values or different time information. The time information may be a time that has passed after a start time at which the communication unit transmitted the update rule to the payment terminal. The initial value may be an irrational number, and the update rule may select a number at a decimal place of the irrational number as the reference number, the decimal place being determined based on the time information.

The memory unit may store a number corresponding to the number of times the payment terminal performed dealings using the electronic money, the number being stored to correspond to the identification number of the payment terminal, and the update rule may uniquely determine the reference number based on an initial number and the number of times the payment terminal performed dealings in such a manner that the reference number is different when the initial value or the number of times is changed.

The memory unit may store a term of validity of the electronic money, and in a case where the term of validity has expired, the operation unit may change the update rule, the communication unit may transmit the changed update rule to the payment terminal, and the processor may update the term of validity stored in the memory unit.

According to a fifth aspect of the present invention, a recording medium storing a computer program that enables communication with a payment terminal and a demanding terminal for making settlement on an electronic money payment for a dealing, the payment terminal being operable to store an electronic money balance for making payment on the dealing, the demanding terminal being operable to demand the payment on the dealing, the program comprises: a storing module that enables a computer to store a check balance of the electronic money to correspond to an identification number of the payment terminal; a communication module that enables the computer to receive, from the demanding terminal, a payment amount of the electronic money to be paid by the payment terminal; and a processing module that enables the computer to update the check balance of the electronic money based on the payment amount received from the demanding terminal, wherein the communication module enables the computer to receive the electronic money balance from the payment terminal when receiving a deposit-requested amount of the electronic money from the payment terminal, and the processing module enables the computer to compare the electronic money balance received from the payment terminal with the check balance, transmit a new balance obtained by the update when the compared balances coincide, and notify a manager of the computer of a warning indicating a possibility of unfair use of the electronic money.

According to a sixth aspect of the present invention, a recording medium storing a computer program for enabling communication with a payment terminal and a demanding terminal to make settlement on an electronic money dealing, the payment terminal being operable to store a check reference number of electronic money for making payment on the dealing by the electronic money, the demanding terminal being operable to demand the payment on the dealing, the program comprises: a storing module that instructs a computer to store a reference number of the electronic money to correspond to an identification number of the payment terminal; an operation module that instructs the computer to update the stored reference number in accordance with a predetermined update rule; a communication module that instructs the computer to receive from the demanding terminal the check reference number of the electronic money, which the demanding terminal was notified from the payment terminal; and a processing module that instructs the computer to compare the stored reference number with the check reference number received from the demanding terminal to validate the electronic money, wherein the update rule uniquely determines the stored reference number based on an initial value and time information in such a manner that the stored reference number is changed when the initial value or the time information is changed.

According to a seventh aspect of the present invention, a demanding terminal that communicates with a payment apparatus, which settles electronic money payment on a dealing, and a payment terminal, which makes electronic money payment on the dealing, the demanding terminal, which demands the payment on the dealing, comprises: a first communication unit operable to communicate with the payment terminal and to receive a check reference number of the electronic money from the payment terminal; a second communication unit operable to communicate with the payment apparatus, to transmit the check reference number of the electronic money to the payment apparatus, and to receive a result of a validation of the electronic money; and a processor operable to calculate a payment amount of the electronic money to be paid by the payment terminal and to make the second communication unit send the payment amount to the payment apparatus, in a case where the second communication unit received a signal indicating that the validation of the electronic money was successful.

The processor may make the first communication unit send the payment amount to the payment terminal in a case where the second communication unit received the signal indicating that the validation of the electronic money was successful, and the processor may make the second communication unit send the payment amount to the payment apparatus in a case where the first communication unit received a confirmation signal for the payment amount from the payment terminal.

The first communication unit may receive, from the payment terminal, an electronic money balance, for making electronic money payment on the dealing, stored in the payment terminal, and the second communication unit may send the electronic money balance stored in the payment terminal to the payment apparatus for validating the electronic money balance stored in the payment terminal with a check balance for the electronic money, stored in the payment apparatus.

The first communication unit may communicate with the payment terminal by optical communication or short-distance communication to receive from the payment terminal an identification number for identifying the payment on the dealing, and the second communication unit may communicate with the payment apparatus via a telephone line or a private communication line to send the identification number to the payment apparatus.

In a case where the first communication unit received from the payment terminal information regarding a start point, at which a user of the payment terminal started to use the electronic money, the processor may calculate the payment amount based on a distance moved by the user from the start point.

According to an eighth aspect of the present invention, a payment terminal for communicating with a payment apparatus, which is operable to store a balance of electronic money for making settlement on a dealing by the electronic money, and a demanding terminal, which is operable to demand the payment on the dealing, the payment terminal, which makes the electronic money payment on the dealing, comprises: a first communication unit operable to communicate with the payment apparatus and to receive, from the payment apparatus, the balance of the electronic money stored in the payment apparatus; a memory unit operable to store the balance of the electronic money received by the first communication unit; a second communication unit operable to communicate with the demanding terminal and to receive a payment amount of the electronic money from the demanding terminal; and a processor operable to update the balance of the electronic money stored in the memory unit based on the payment amount.

The first communication unit may receive the balance of the electronic money from the payment apparatus in a case where a deposit-requested amount of the electronic money was sent to the payment apparatus.

The second communication unit may send the balance stored in the memory unit to the payment apparatus for validating the balance, when sending the deposit-requested amount of the electronic money to the payment apparatus, and may receive a new balance from the payment apparatus in a case where the validation of the balance was successful.

The second communication unit may send the balance stored in the memory unit to the payment apparatus when a predetermined time has passed after a time at which the new balance was received from the payment apparatus, and may receive a result of the validation of the balance.

The memory unit may store a term of validity of the electronic money, and the processor may notify a user of the payment terminal that the electronic money is unavailable in a case where a time that has passed after a start time, at which the second communication unit received the new balance from the payment apparatus, has gone beyond the term of validity.

According to a ninth aspect of the present invention, a payment terminal that communicates with a payment apparatus and a demanding terminal to make payment on a dealing using electronic money, the payment apparatus stores a reference number of the electronic money for making settlement on the dealing by electronic money, the demanding terminal demands the payment on the dealing, the payment terminal comprises: a memory unit operable to store a check reference number of the electronic money; a first communication unit operable to communicate with the payment apparatus and to receive from the payment apparatus an update rule for updating the check reference number stored in the memory unit; an operation unit operable to update said check reference number stored in said memory unit in accordance with said update rule; and a second communication unit operable to communicate with the demanding terminal and to send the check reference number, after being updated by the operation unit, to the demanding terminal.

The first communication unit may receive from the payment apparatus the update rule for updating the check reference number in a case where a deposit-requested amount of the electronic money is sent to the payment apparatus. The update rule may uniquely determine the check reference number based on an initial value and time information in such a manner that the check reference number is changed when the initial value or time information is changed. The time information may be a time period that has passed after a time at which the update rule was received by the first communication unit. The initial value may be an irrational number, and the update rule may select a number at a decimal place of the irrational number as the check reference number, the decimal place being determined based on the time information.

The memory unit may store a number of times that dealings using the electronic money were performed, and the update rule may uniquely determine the check reference number based on an initial value and the number of times that dealings were performed in such a manner that the check reference number is changed when the initial value or the number of times is changed.

The memory unit may store a term of validity of the electronic money, and in a case where the term of validity has expired, the first communication unit may send a change request for the update rule to the payment apparatus and may receive a changed update rule from the payment apparatus, while the operation unit updates the term of validity stored in the memory unit.

The first communication unit may communicate with the payment apparatus by wireless telecommunication, and the second communication unit may communicate with the demanding terminal by optical communication or short-distance wireless communication to send an identification number for identifying the payment terminal to the demanding terminal.

The second communication unit may receive from the demanding terminal start point information regarding a start point at which a user of the payment terminal starts to use the electronic money, the memory unit may store the start point information, and the second communication unit may send the start point information to the demanding terminal so that the payment amount is calculated based on a distance moved by the user from the start point, in a case where the user finishes using the electronic money.

According to a tenth aspect of the present invention, a communication adapter, to which a payment terminal for making electronic money payment on a dealing is attached, whereby the payment terminal communicates with a charging system for a toll road, the communication adapter comprises: a detection unit operable to detect an electric wave signal transmitted from the charging system; and a control unit operable to make the payment terminal, attached to the communication adapter, communicate with the charging system by wireless communication to send the charging system a check reference number of electronic money stored in the payment terminal for validation of the electronic money, in a case where the electric signal from the charging system was detected.

The communication adapter may further comprise a sound notification unit operable to generate a first sound for notifying a result of the validation of the electronic money, in a case where the result of the validation of the electronic money was received from the charging system.

The payment terminal may send a balance of the electronic money to the charging system, and the sound notification unit may generate a second sound for notifying a shortage of the balance of the electronic money, in a case where the shortage of the balance was notified from the charging system.

According to an eleventh aspect of the present invention, a payment terminal for communicating with a charging system of a toll road to pay toll by electronic money, comprises: a memory unit operable to store a check reference number of the electronic money; a detection unit operable to detect an electric wave signal transmitted from the charging system; and a communication unit operable to communicate with the charging system to send the check reference number, stored in the memory unit, to the charging system, in a case where the detection unit detected the electric wave signal.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

BRIEF DESCRIPTION OF DRAWINGS

FIG. 12 explains an exemplary update rule for a reference number according to one embodiment of the present invention.

FIGS. 26A–26E show exemplary screens of a register-side display 702 of the register terminal 10 in FIG. 1.

FIGS. 32A–32F show further exemplary screens of the display 802 of the user's terminal 20 in FIG. 1.

DETAILED DESCRIPTION

Figure 1:
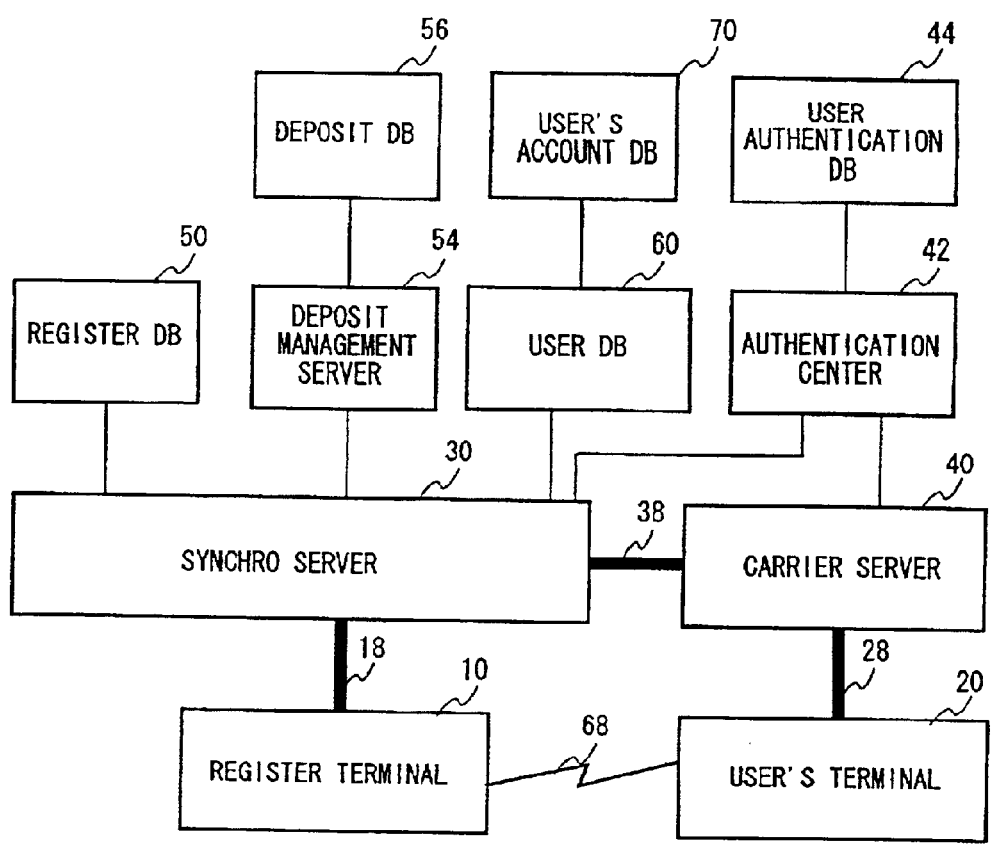
FIG. 1 is a block diagram of an electronic payment system according to a first embodiment of the present invention.

Exemplary embodiments of the present invention are described below, referring to the drawings.
(Embodiment 1) An electronic payment system according to a first embodiment of the present invention is described. In the electronic payment system of the present embodiment, when a consumer buys goods at a retail store, for example, the consumer can make payment electronically by using electronic money. Hereinafter, the customer is called a user. As used herein, electronic money is a generic term for digital currency.

FIG. 1 is a block diagram of the electronic payment system of the present embodiment. The electronic payment system of the present embodiment includes a register terminal 10 as an example of a demanding terminal, a user's terminal 20 as an example of a payment terminal, a synchro server 30 as an example of a payment apparatus, a carrier server 40, an authentication center 42, a user authentication database 44, a register database 50, a deposit management server 54, a deposit database 56, a user database 60 and a user's account database 70.

The register terminal 10 demands payment for dealings by electronic money, while the user's terminal 20 makes the payment by electronic money. The synchro server 30 communicates with the user's terminal 20 via the carrier server 40, and communicates with the register terminal 10 so as to make settlement of the payments for dealings by electronic money.

A communication line 18 connects the register terminal 10 and the synchro server 30, and may be a telephone line or a private communication line. A wireless communication transmission path 28 is an example of a transmission path of wireless telephone communication between the user's terminal 20 and the carrier server 40.

A communication line 38 connects the carrier server 40 and the synchro server 30, and may be a telephone line or a private line. A short-distance communication transmission path 68 is one example of a transmission path to be used when the register terminal 10 and the user's terminal 20 make short-distance communication with each other. As a short-distance communication technique, optical communication, such as infrared communication, or wireless short-distance communication, such as Bluetooth, may be used.

Figure 2:
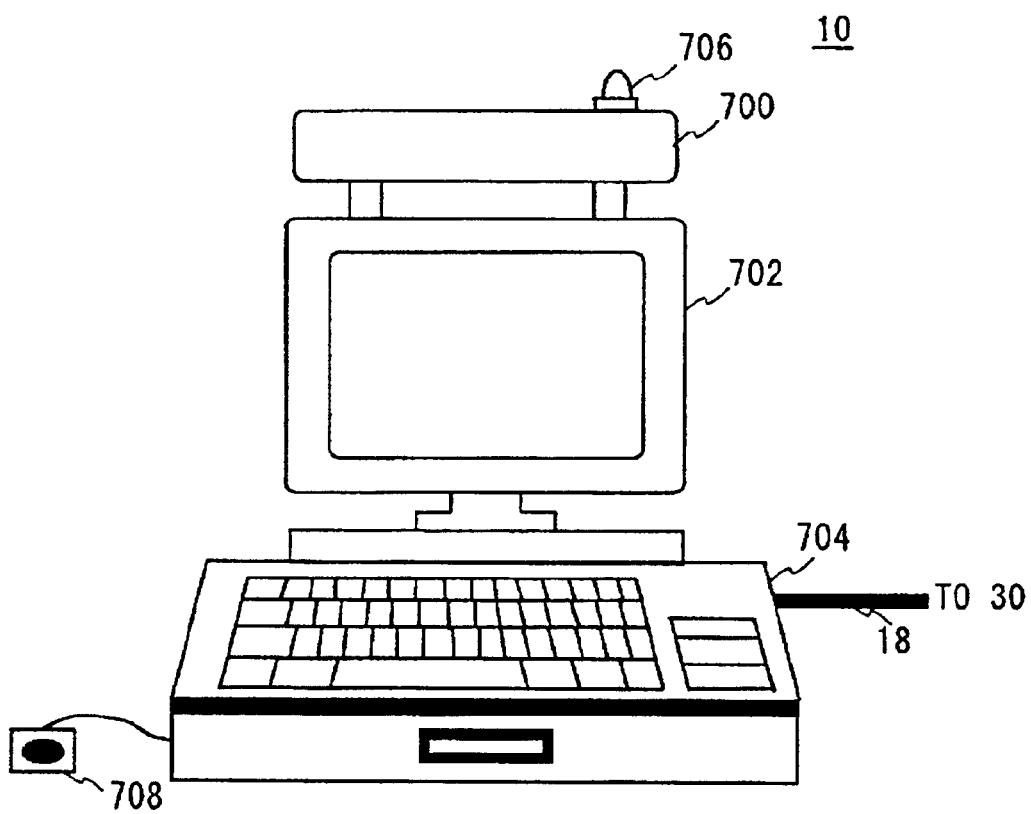
FIG. 2 shows an exemplary appearance of a register terminal 10 in FIG. 1.

The register terminal 10 calculates the price of the goods that the user bought at a retail store, for example, and charges the user for the goods. FIG. 2 schematically shows an appearance of the register terminal 10. The register terminal 10 includes a customer-side display 700, a register-side display 702, a register body 704, a receipt lamp 706, and an infrared communication unit 708 as an example of a short-distance communication unit. Moreover, the register terminal 10 has communication functionality by being connected to the synchro server 30 via a telephone line or a private line, although the function is not shown in FIG. 2. The register terminal 10 can access the synchro server 30 by dialup connection via the telephone line or by accessing a server gate via the private communication line.

The customer-side display 700 has a display part, such as a liquid crystal display (LCD), for displaying character information, on the rear of the register terminal 10, thereby displaying the total of the prices of the purchased goods and/or stages in the electronic payment process so as to notify the user. The register-side display 702 displays stages in calculation of the prices of the goods and/or the stages in the electronic payment process.

The receipt lamp 706 is turned on in order to notify that communication from the user's terminal 20, described later, is being performed. The infrared communication unit 708 performs infrared data communication with an infrared communication unit 808 (see FIG. 3) of the user's terminal 20 of the user. A wireless short-distance communication unit for performing wireless short-distance communication by Bluetooth, for example, may be provided in place of the infrared communication unit 708 so as to perform wireless short-distance data communication with a wireless short-distance communication unit of the user's terminal 20.

The user's terminal 20 stores electronic money and makes payments by electronic money on the goods purchased by the user. As an example of the user's terminal 20, a wireless phone device, such as a mobile phone, can be considered. Another exemplary user's terminal 20 is a hand-held device such as a PDA (personal digital assistant) or a notebook computer, that can perform communication by being connected to a wireless communication device, such as the mobile phone.

Figure 3:
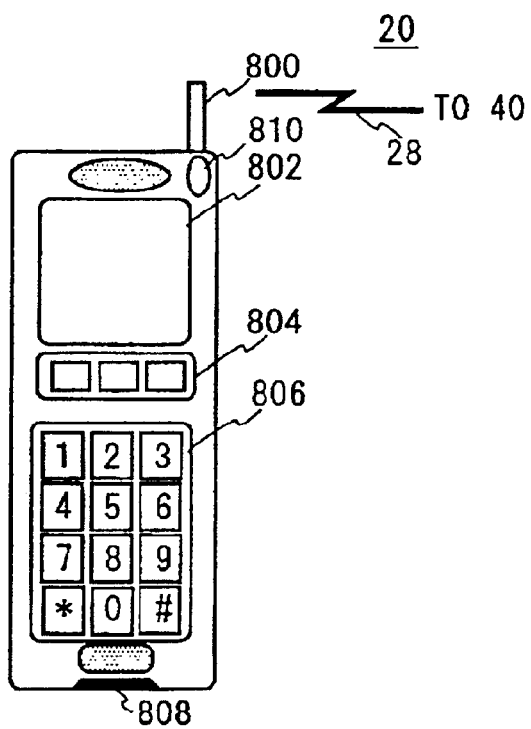
FIG. 3 shows an appearance of a mobile phone as an example of a user's terminal 20 in FIG. 1.

FIG. 3 shows an appearance of a mobile phone that is an example of the user's terminal 20. The user's terminal 20 includes an antenna 800, a display 802, operating buttons 804, dial buttons 806, an infrared communication unit 808, and an electronic money button 810. The user's terminal 20 communicates with the carrier server 40 by means of the antenna 800 via the wireless communication transmission path 28. The user's terminal 20 has a data-packet communication function and can transmit/receive digital data. The display 802 displays character information and image information transmitted/received by the data-packet communication function.

The operating unit 804 are buttons used for selection of a menu or buttons displayed on the display 802. The dial buttons 806 are used for inputting a phone number, a password or the like. The infrared communication unit 808 performs data communication with the infrared communication unit 708 (note FIG. 2) of the register terminal 10. The user's terminal 20 may include a wireless short-distance communication unit that performs wireless short-distance communication, for example, by Bluetooth, in place of the infrared communication unit 808, so as to perform wireless short-distance data communication with a wireless short-distance communication unit of the register terminal 10.

The user's terminal 20 is connected to the carrier server 40 by the wireless communication transmission path 28. The carrier server 40 is connected to the synchro server 30 by the communication line 38. Therefore, the user's terminal 20 can perform data communication with the synchro server 30.

Figure 4:
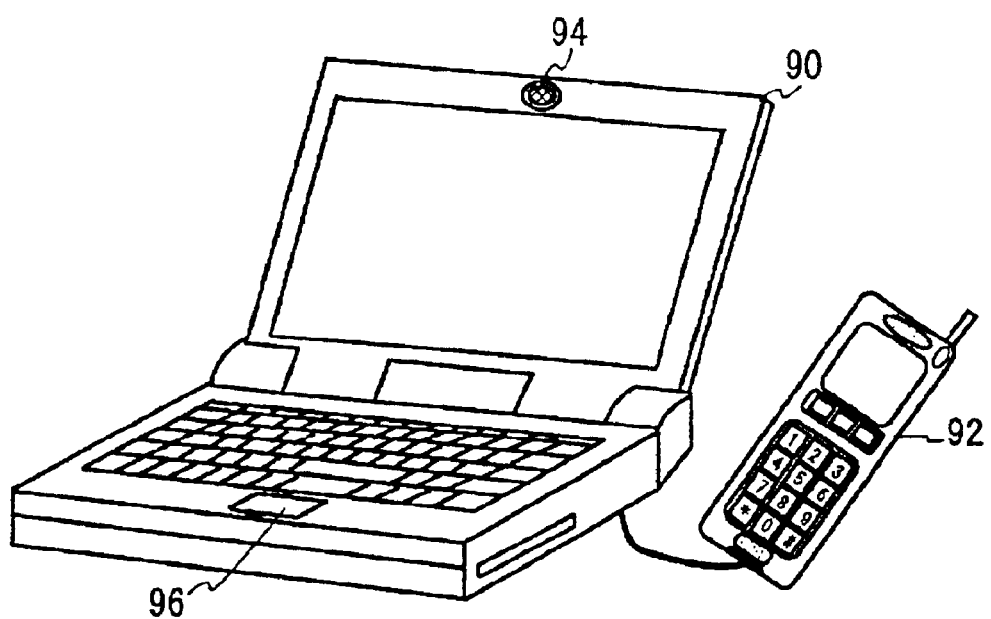
FIG. 4 shows an appearance of a hand-held device with a communication function as another example of the user's terminal 20 in FIG. 1.

FIG. 4 shows a hand-held device 90 having communication functionality that is another exemplary user's terminal 20 according to the present embodiment. The hand-held device 90 can perform wireless communication when connected to a mobile phone 92. A CCD camera 94 can capture an image of the user's face or pupil or retina of an eye. A fingerprint detection pad 96 can capture an image of a fingerprint of the user.

The synchro server 30 can communicate with the user's terminal 20 and the register terminal 10, and manage and perform the payment operations of the dealings between a retail store and the user. The synchro server 30 is connected to the register database 50 in which information regarding various register terminals 10 is stored, the user database 60 in which information regarding various user's terminals 20 is stored, and the user's account database 70 in which information regarding a credit account or a bank account is stored for each user, and retrieves necessary information from the respective databases.

Moreover, the synchro server 30 is connected to the deposit management server 54, so as to instruct the deposit management server 54 to deposit electronic money, make payment by electronic money and the like. The deposit management server 54 is connected to the deposit database 56, and can retrieve information such as a deposit amount of electronic money of the user, the balance, a reference number of the electronic money, the term of validity of the electronic money and the like.

The synchro server 30, the deposit management server 54, the deposit database 56, the register database 50, the user database 60 and the user's account database 70 may be provided in a network of a credit card company or a bank. Moreover, only the user's account database 70 may be provided in the network of the credit card company or the bank, while the synchro server 30 is connected to the user's account database 70 via a private communication line.

A part or all of the functions of the deposit management server 54 may be implemented in the synchro server 30. In order to simplify the following description, it is assumed that the synchro server 30 performs all the functions of the deposit management server 54.

The synchro server 30 is connected to the register terminal 10 and the user's terminal 20 via a communication network, thereby performing data communication. The synchro server 30 acquires information regarding charging of the dealings by communicating with the register terminal 10. The synchro server 30 also deposits electronic money, checks the balance and sets the term of validity for the electronic money, by communicating with the user's terminal 20.

Figure 5:
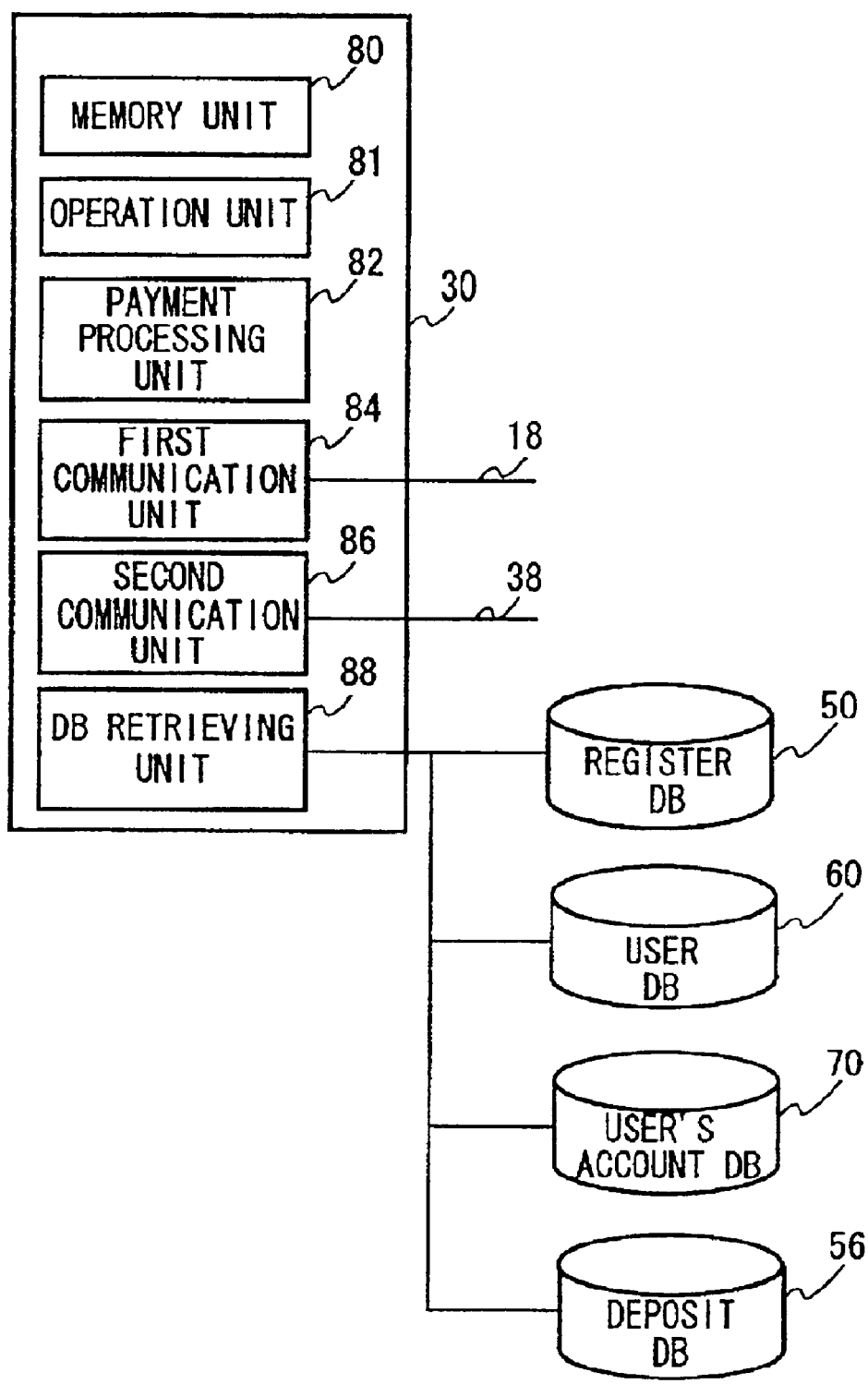
FIG. 5 is a functional block diagram of a synchro server 30 in FIG. 1.

FIG. 5 is a functional block diagram of the synchro server 30. The synchro server 30 includes a memory unit 80 for storing information regarding electronic money; an operation unit 81 for calculating a reference number of the electronic money; a payment processing unit 82 for processing a payment operation; the first communication unit 84 for handling data communication via the communication line 18; the second communication unit 86 for handling data communication via the communication line 38 and the wireless communication transmission path 28; and a database retrieving unit 88 for accessing the register database 50, the user database 60, the user's account database 70 and the deposit database 56 so as to retrieve information in the respective databases.

The memory unit 80 stores information indicating the balance, the term of validity, or the like, of electronic money. However, the information regarding electronic money may be stored in the deposit database 56 so as to correspond to the user's terminal 20. In this case, only information regarding electronic money corresponding to a certain user's terminal 20 may be retrieved from the deposit database 56 and temporarily stored in the memory unit 80.

In a case where the register terminal 10 is connected to the synchro server 30 by dialup connection, the synchro server 30 may detect a caller number of the register terminal 10 and refuse access from phone numbers other than specific caller numbers. Moreover, an apparatus that can recognize the caller number may be provided at a reception port of the synchro server 30 so as to refuse a connection request from phone numbers other than the numbers of specific member stores.

Figure 6:
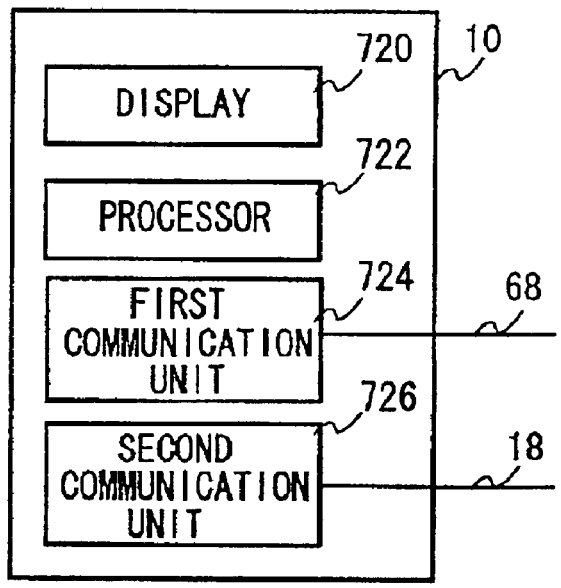
FIG. 6 is a functional block diagram of the register terminal 10 in FIG. 1.

FIG. 6 is a functional block diagram of the register terminal 10. The register terminal 10 includes a display 720 for displaying the status of the electronic-money payment operation, the balance of electronic money and the like; a processor 722 for performing the electronic-money charging process; the first communication unit 724 for handling data communication via the short-distance communication transmission path 68; and the second communication unit 726 for handling data communication via the communication line 18.

Figure 7:
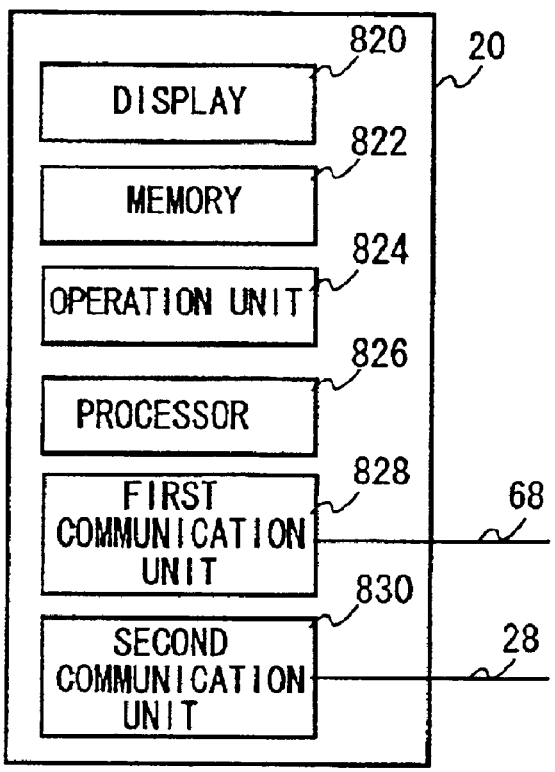
FIG. 7 is a functional block diagram of the user's terminal 20 in FIG. 1.

FIG. 7 is a functional block diagram of the user's terminal 20. The user's terminal 20 includes a display 820 for displaying the status of the electronic-money payment process, the balance of electronic money and the like; a memory 822 for storing the balance, the term of validity, and the like of electronic money; an operation unit 824 for calculating the reference number of the electronic money; a processor 826 for performing the electronic-money payment process; the first communication unit 828 for handling data communication via the short-distance communication transmission path 68; and the second communication unit 830 for handling data communication via the wireless communication transmission path 28.

In the electronic payment system using electronic money according to the present invention, in order to prevent falsification or unfair use of the electronic money, both the user's terminal 20 and the synchro server 30 store the balance and the reference number of the electronic money and check or validate the balance and the reference number between the user's terminal 20 and the synchro server 30.

Since the register terminal 10 receives the user's terminal number of the user's terminal 20 from the user's terminal 20 so as to know the balance of the electronic money thereof, the register terminal 10 can make improper or unauthorized use of the electronic money of the user's terminal 20 by using the user's terminal number even though the use of the electronic money is not requested from the user's terminal 20. Therefore, measures for preventing all unfair use are necessary.

Thus, by comparing the balance of electronic money stored in one of the user's terminal 20 and the synchro server 30 with that stored in the other so as to check whether or not the compared balances are coincident, unfair use can be detected because of a disagreement of the balances, even if the register terminal 10 uses the electronic money under a situation where the user has no concern with that use. Moreover, in a case where the register terminal 10 requests payment from the synchro server 30, by transmitting a reference number of the electronic money and checking the transmitted reference number with the reference number stored in the synchro server 30, unfair use can be found because of disagreement of the reference numbers, if the register terminal 10 unfairly uses the electronic money of the user without obtaining the correct reference number from the user's terminal 20.

As described above, by checking the balance and the reference number, unfair use can be found because of disagreement of the balance or reference number when the user's terminal 20 or the register terminal 10 uses the electronic money unfairly, or a person other than the user unfairly uses the user's electronic money.

The electronic money payment system of the present invention is divided into a phase in which the user withdraws electronic money, a phase in which the user inquires the balance of electronic money, and a phase in which the user spends electronic money and makes payment by electronic money, and those phases are described one by one.

Figure 8:
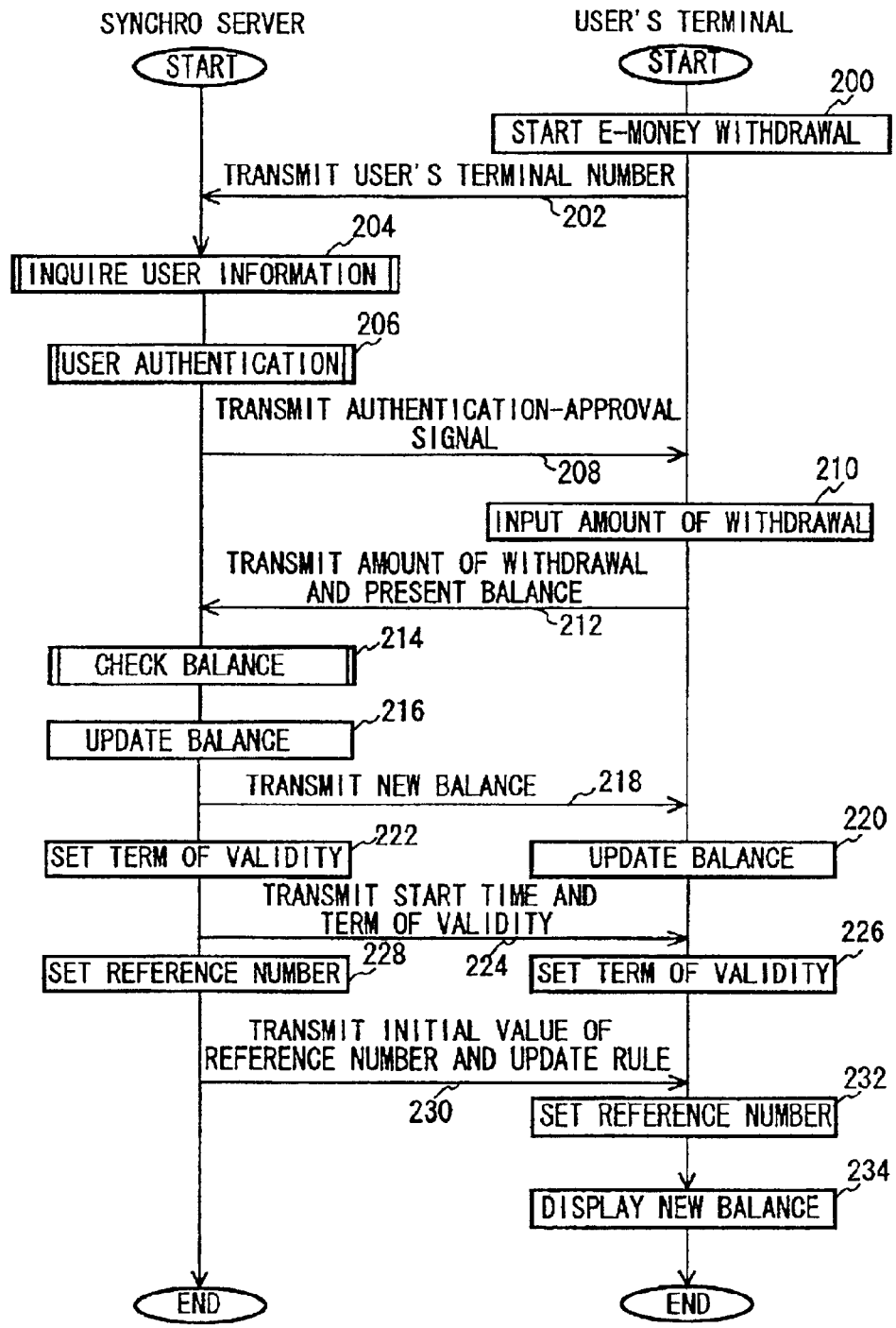
FIG. 8 is a flowchart of an electronic money deposit process of the electronic payment system according to the first embodiment.
Figure 9:
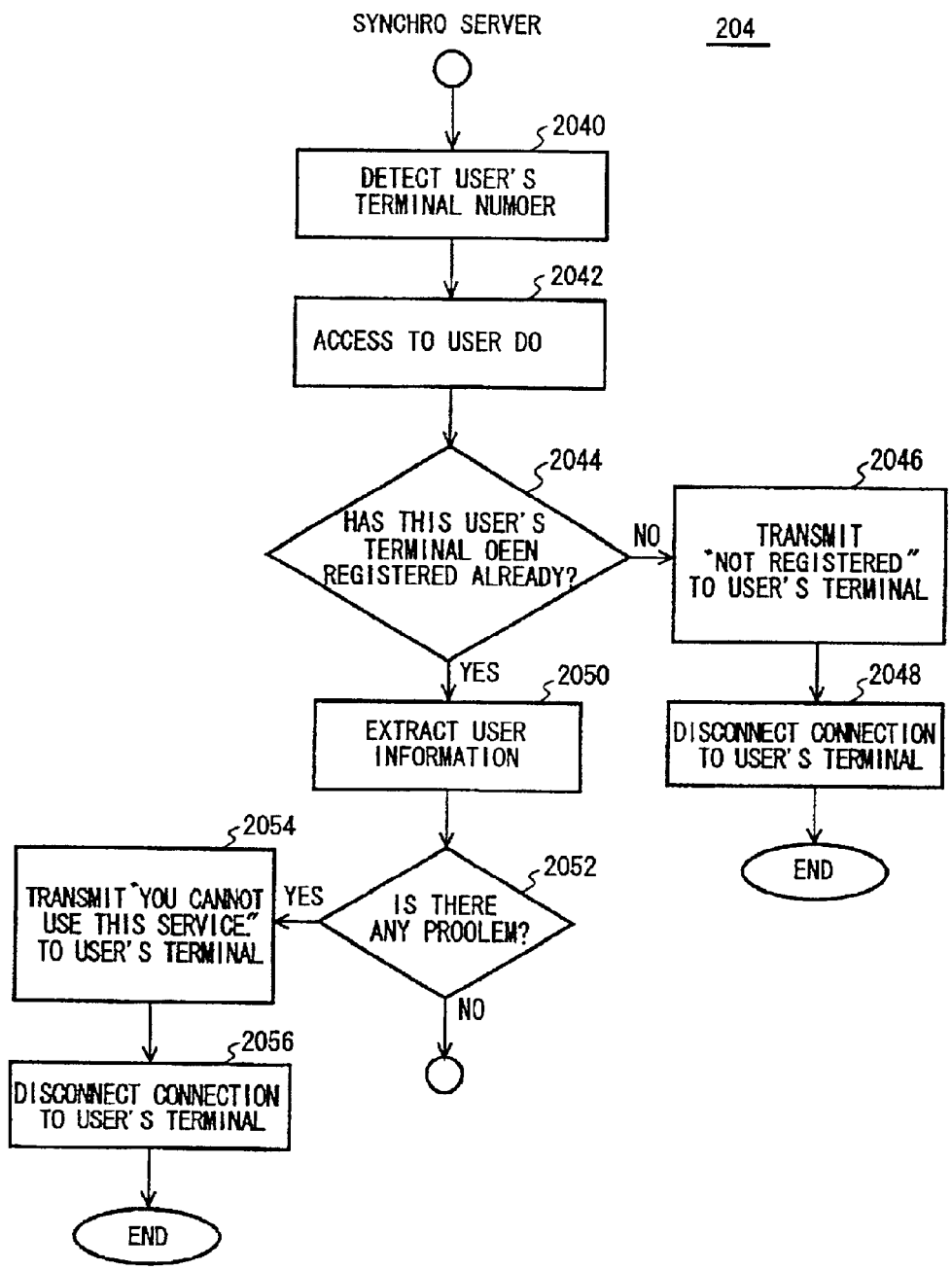
FIG. 9 is a flowchart of a user information inquiry process 204 in FIG. 8.
Figure 10:
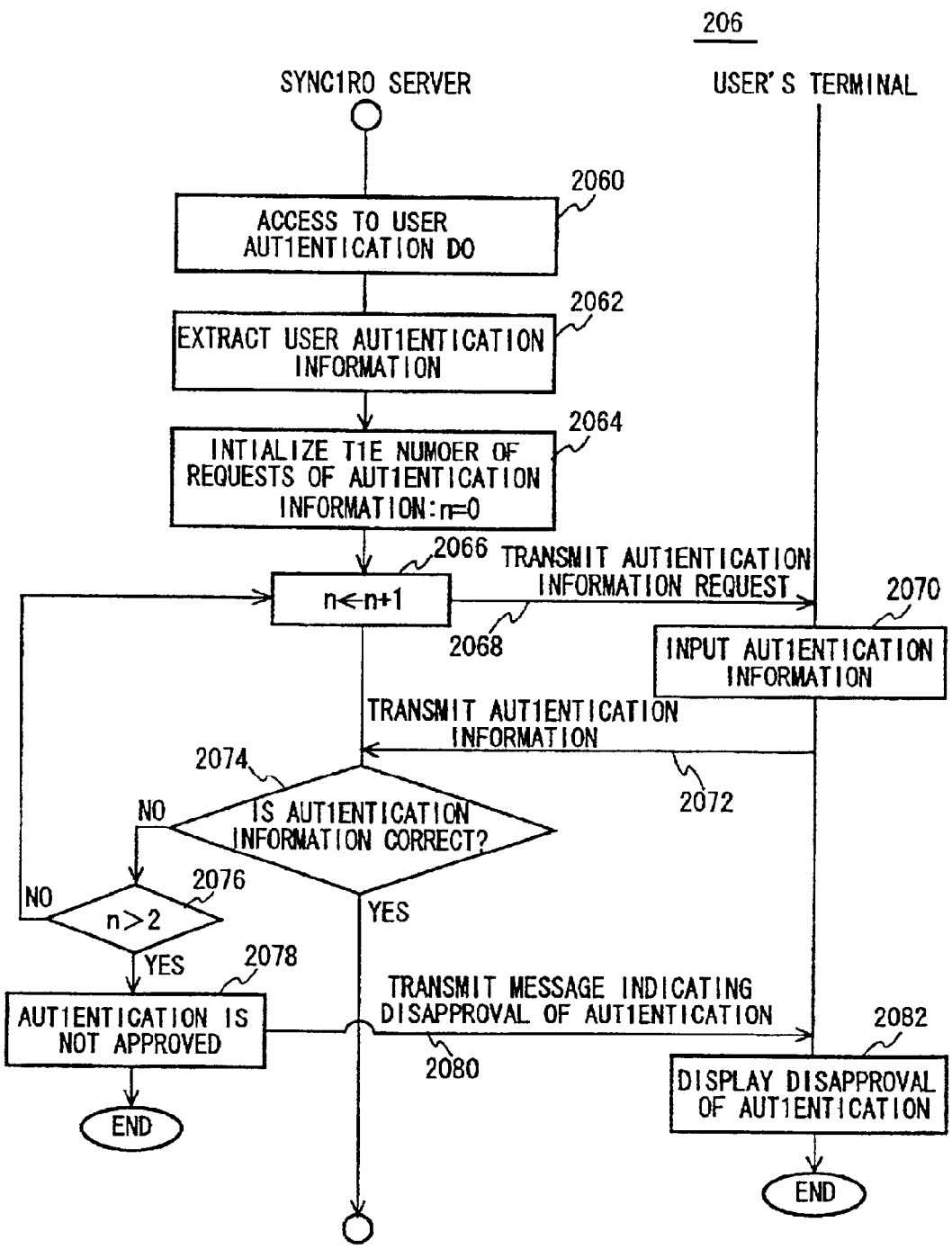
FIG. 10 is a flowchart of a user authentication process 206 in FIG. 8.
Figure 11:
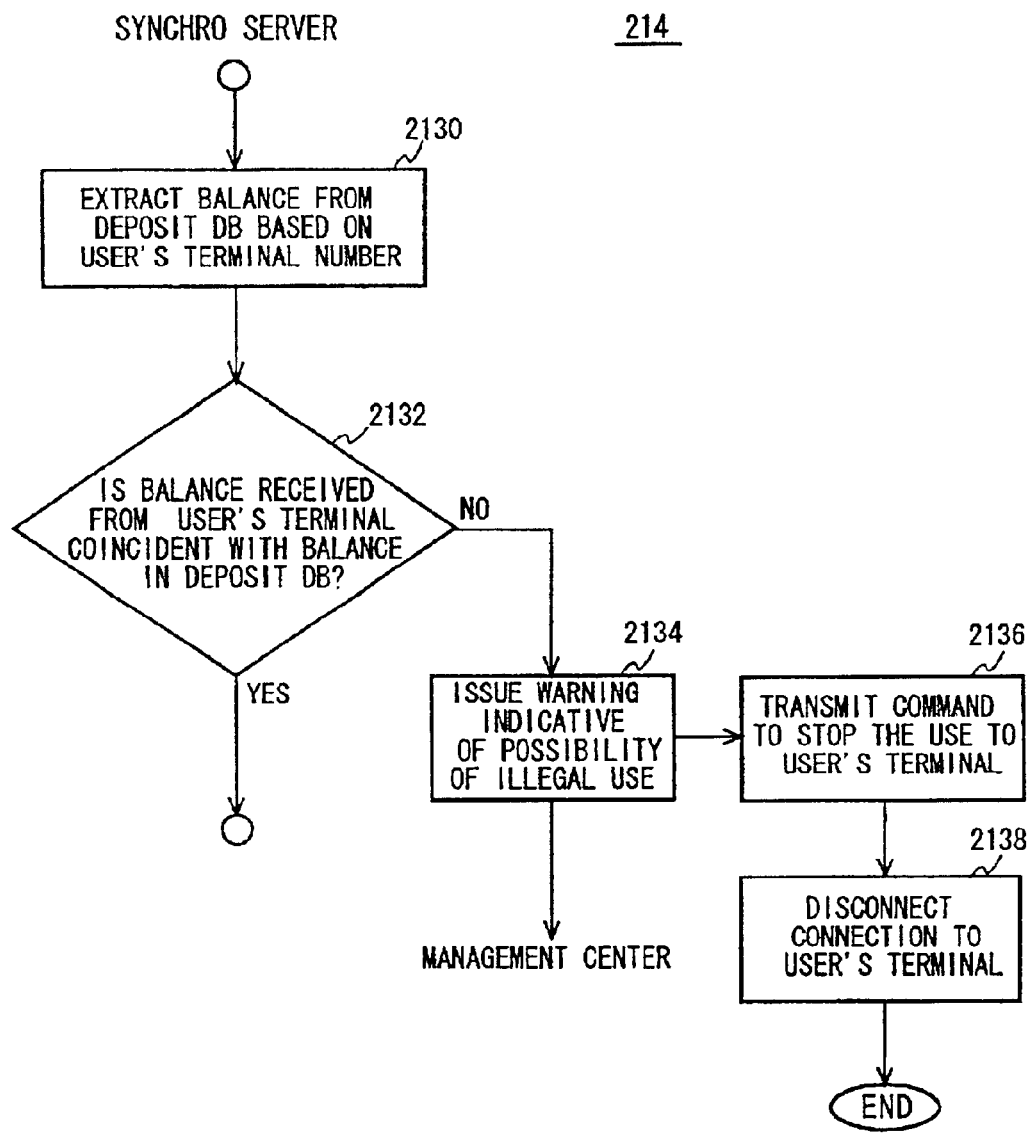
FIG. 11 is a flowchart of a balance inquiry process 214 in FIG. 8.

First, referring to FIGS. 8–11, the deposit process of electronic money in the electronic money payment system of the present embodiment is described. FIG. 8 is a flowchart of the electronic money deposit process in the electronic money payment system of the present embodiment. The processes by the user's terminal 20 and the synchro server 30 are shown in the flowchart in term of the passage of time, while data communication between the user's terminal 20 and the synchro server 30, via the wireless communication transmission path 28 and the communication line 38, are shown with horizontal arrows. FIGS. 9–11 are flowcharts showing more details of the process in FIG. 8. Moreover, FIGS. 19A–19G show exemplary display screens of the display 802 of the user's terminal 20.

Referring to FIG. 8, the process in which the user withdraws electronic money and deposits electronic money in the user's terminal 20 is described. The user's terminal 20 can store the amount of the electronic money, and, when the electronic money has been newly withdrawn from the user's account database, add the newly withdrawn amount to the previously stored balance of the electronic money so as to update the stored balance of electronic money.

Figure 19:
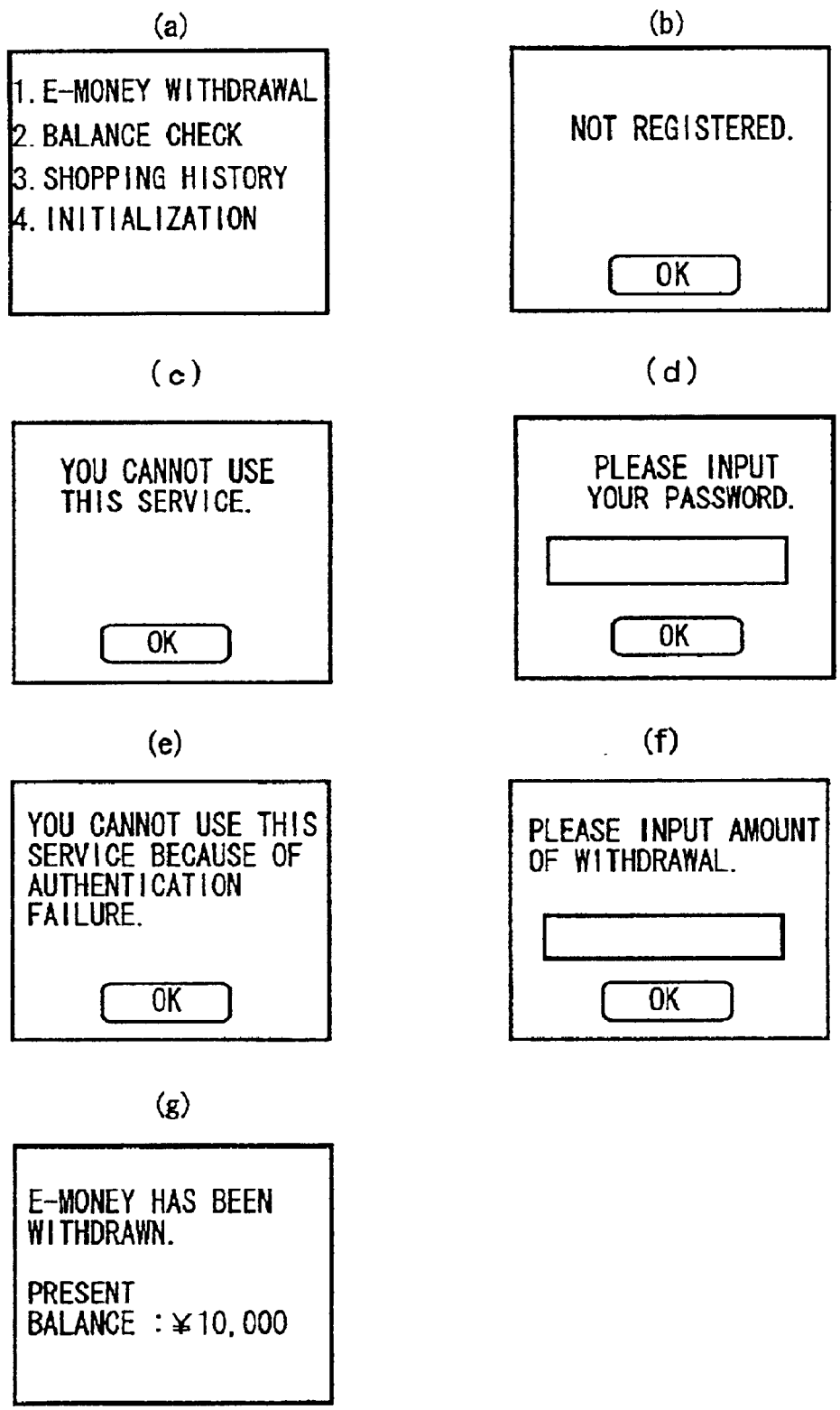
FIGS. 19A–19G show exemplary screens of a display 802 of the user's terminal 20 in FIG. 1.

The user selects "ELECTRONIC MONEY WITHDRAWAL" from the menu of the electronic money payment, which is exemplified in FIG. 19A, thereby starting the electronic money withdrawal process (Step 200). The user's terminal 20 is connected to the synchro server 30, so that it transmits the user's terminal number (Step S202). The user's terminal number is an identification number unique to the user's terminal 20. In a case where the user's terminal 20 is a mobile phone, the user's terminal number may be a caller phone number. The synchro server 30 receives the user's terminal number from the user's terminal 20 and inquires information regarding the user of the user's terminal 20 based on the user's terminal number (Step 204).

Referring to FIG. 9, the process of inquiring the user information in Step 204 is described. The synchro server 30 detects the user's terminal number of the user's terminal 20 (Step 2040). The synchro server 30 then accesses the user database 60 (Step 2042), and checks whether or not user registration for that user's terminal 20 has been already done (Step 2044). If the user's terminal 20 has not been registered, the synchro server 30 transmits a message of "NOT REGISTERED" to the user's terminal 20 (Step 2046). On the user's terminal 20, a display shown in FIG. 19B is displayed, that indicates that the user has not been registered. Then, the synchro server 30 disconnects the connection to the user's terminal 20 (Step 2048), finishing the process.

In a case where it was confirmed that the user registration had been done, user information is extracted from the user database 60 (Step 2050). The user information is information describing the status of the use of electronic money by the user. Then, it is checked whether or not there is any problem with the using status (Step 2052). If there is a problem, the synchro server 30 transmits a message of "YOU CANNOT USE THIS SERVICE." to the user's terminal 20 (Step 2054). On the user's terminal 20, a display shown in FIG. 19C is displayed, indicating that the user cannot use the electronic payment system. The synchro server 30 then disconnects the connection to the user's terminal 20 (Step 2056), finishing the process.

Returning to FIG. 8, the synchro server 30 performs an authentication operation for the user of the user's terminal 20 (Step 206). The synchro server 30 communicates with the authentication center 42 (note FIG. 1) and performs the authentication operation for the user. The authentication center 42 has a user authentication database 44, and can retrieve and extract authentication information for the authentication operation for the user. A part or all of the functions of the authentication center 42 may be implemented in the synchro server 30. For simplified description, it is assumed that the synchro server 30 performs the functions of the authentication center 42.

A mobile phone, as an example of the user's terminal 20, has a caller phone number unique to each mobile phone. The unique caller phone number is used whenever the user calls someone. The caller phone number is uniquely assigned to the mobile phone and it is therefore impossible to make a telephone call from another mobile phone by using the same caller phone number. Therefore, as long as the mobile phone is used by an owner thereof, the caller phone number of the mobile phone can be used as an ID of the user.

However, if the owner of the mobile phone loses the mobile phone and a person other than the owner uses that mobile phone, it is unclear whether the user of the mobile phone is the actual owner of the mobile phone, although the mobile phone can be specified uniquely. Thus, in the electronic payment system of the present embodiment, data that makes the caller phone number of the mobile phone correspond to the actual owner of the mobile phone is stored in the user database 60, and it is confirmed whether or not the user of the mobile phone is the owner.

The synchro server 30 detects the caller phone number of the user's terminal 20 when being connected to the user's terminal 20, and retrieves and extracts information regarding the user in the user database 60 based on the caller phone number, thereby authenticating the user. As an authentication technique, a visual authentication, password authentication, sound authentication or the like can be considered. These authentication techniques can be used in combination.

In the case of visual authentication, the synchro server 30 extracts photo data of the user's face from the user database 60 and transmits it to the register terminal 10 so that a clerk operating the register terminal 10 can confirm whether or not the user is a registered person. In the case of password authentication, the synchro server 30 extracts password information from the user database 60 and transmits a password request instruction to the user's terminal 20, thereby making the user input the password and then making the user's terminal 20 transmit the input password.

The synchro server 30 checks the password thus transmitted with the password registered in the user database 60, and then transmits the result of the authentication to the register terminal 10. In the case of sound authentication, audio data obtained when the user speaks a registration word is recorded onto the database in place of the password. In this case, the user is prompted to speak the registration word so as to input the audio data from the user's terminal 20, so that the audio data is transmitted to the synchro server 30.

Moreover, in a case where visual authentication is insufficient, for example, the accuracy of the authentication can be improved by performing multiple authentication, for example, by combining the visual authentication with other authentication techniques, such as the password authentication.

The process of the user authentication operation in Step 206 is described referring to FIG. 10. The synchro server 30 accesses the user authentication database 44 (note FIG. 1) in order to perform the authentication operation (Step 2060), and then extracts information required for the authentication operation (Step 2062). As the user authentication information, a password registered by the user, photo data of the face, audio data, image data of a fingerprint and image data of an eye pupil or retina of the user, and the like can be used. The synchro server 30 initializes a variable n that indicates how many times the authentication information is requested to zero (Step 2064).

The synchro server 30 then increments n by one (Step 2066), and transmits the authentication information request message to the user's terminal 20 (Step 2068). In the case where the authentication information is the password, the user's terminal 20 displays a screen shown in FIG. 19D, and the user then inputs the password as the authentication information (Step 2070). In the case where the authentication information is the audio data, the user inputs sound to the user's terminal.

In the case of inputting sound, a call is made to the authentication center 42, via the carrier server 40, so as to transmit the audio data thus input. In the case where the authentication information is image data, such as the photo of the face, fingerprint, eye pupil, retina and the like, the user transmits the image data of the face, fingerprint, eye pupil, retina and the like by using a CCD camera or a fingerprint input pad included in or connected to the hand-held device.

The user's terminal 20 transmits the authentication information input by the user to the synchro server 30 (Step 2072). The synchro server 30 receives the authentication information from the user's terminal 20 and then checks the received authentication information with that registered in the user authentication database 44 (Step 2074).

If the authentication information transmitted from the user's terminal 20 is not correct, it is checked whether or not the number of password requests is larger than two (Step 2076). If n is not larger than two, the flow goes back to Step 2066 and repeats the request of the authentication information. If n is larger than two, the authentication operation is finished (Step 2078) and a message indicating disapproval of authentication is transmitted to the user's terminal 20 (Step 2080). The user's terminal 20 displays a screen shown in FIG. 19E that notifies that the user cannot use this service because of failure of authentication (Step 2082).

If the synchro server 30 confirms that the authentication information is correct in authentication information checking Step 2074, the authentication operation in Step 206 is finished. Returning to FIG. 8, the synchro server 30 transmits a signal indicating the user has been successfully authenticated to the user's terminal 20 (Step 208). Then, a screen shown in FIG. 19F for allowing the user to input the amount of withdrawal of electronic money is displayed on the user's terminal 20, and the user inputs the amount of withdrawal (Step 210). The user's terminal 20 transmits the amount of withdrawal input by the user and the present balance to the synchro server 30.

The synchro server 30 compares the balance of the electronic money received from the user's terminal 20, which has been input to the user's terminal 20 already, with the balance of the electronic money recorded in the synchro server 30 so as to check whether or not the balances are coincident (Step 214).

The process of checking the balances in Step 214 is described referring to FIG. 11. The synchro server 30 extracts the balance of the electronic money that has been deposited in the user's terminal 20 from the deposit database 56 based on the user's terminal number of the user's terminal 20 (Step 2130). It is determined whether or not the balance received from the user's terminal 20 is coincident with the balance stored in the deposit database 56 (Step 2132). If the balances are not coincident with each other, there is a possibility of unfair use.

In a case where the balance of the electronic money stored in the user's terminal 20 is larger than that stored in the deposit database 56, there is a possibility that a person other than the user unfairly spent the electronic money and the user has not realized the unfair use. Also, there is a possibility that the user forged the balance of the electronic money. In such cases, the synchro server 30 transmits a warning message indicating the possibility of unfair use to the management center or a manager of the electronic payment system of the present embodiment (Step 2134). The synchro server 30 transmits an instruction to stop the use to the user's terminal 20 (Step 2136), and disconnects the connection to the user's terminal 20 (Step 2138), finishing the process.

Returning to FIG. 8, In a case where the check of the balance in Step 214 was successful, the synchro server 30 accesses the user's account database 70 so as to withdraw the amount of electronic money specified by the user in Step 210, and then adds the withdrawn amount to the present balance of the electronic money, thereby updating the balance (Step 216).

The synchro server 30 transmits the new updated balance to the user's terminal 20 (Step 218). The user's terminal 20 receives the new balance, and updates the electronic money balance stored in the user's terminal 20 to the new balance (Step 220).

The synchro server 30 then sets the term of validity of the electronic money (Step 222). The electronic money is withdrawn from the user's account, then a time at which the new, updated balance was transmitted to the user's terminal 20 is set as a start time, and then the term of validity is set as a time period or days after the start time. For example, the term of validity is set to three days or ten days from the start time. The synchro server 30 transmits the start time and term of validity thus set to the user's terminal 20 (Step 224). The user's terminal 20 records the start time and the term of validity that were received from the synchro server 30 so as to correspond to the newly deposited electronic money (Step 226).

The synchro server 30 then sets a new reference number of the electronic money, and stores the newly set reference number in the deposit database 56 so as to correspond to the electronic money (Step 228). The reference number is calculated from an initial value of the reference number and an update rule for updating the reference number. The update rule of the reference number is described later. The synchro server 30 transmits the initial value and update rule of the reference number to the user's terminal 20 (Step 230), thereby finishing the process.

The user's terminal 20 records the initial value and update rule of the reference number that were received from the synchro server 30 so as to correspond to the electronic money (Step 232). The user's terminal 20 displays the new balance of the electronic money by a screen shown in FIG. 19G (Step 234), thereby finishing the process.

In the above deposit process of the electronic money, the user information inquiry process 204, the user authentication process 206, the balance check process 214, the balance update process 216, the setting of the term of validity 222 and the setting of the reference number 228, that are performed by the synchro server 30, are performed by the payment processing unit 82 and the database retrieving unit 88 of the synchro server 30 (note FIG. 5).

Moreover, the communication process, that is data communication the synchro server 30 performs with the user's terminal 20, including the receipt in Step 202 of the user's terminal number from the user's terminal 20, the transmission in Step 208 of the authentication-approval signal to the user's terminal 20, the receipt in Step 212 of the withdrawn amount and the present balance from the user's terminal 20, the balance update in Step 218 to the user's terminal 20, the transmission in Step 224 of the start time and term of validity to the user's terminal 20, and the transmission in Step 230 of the initial value and update rule of the reference number to the user's terminal 20 (note FIG. 8) is handled by the second communication unit 86 of the synchro server 30.

Next, the reference number of the electronic money is described. In order to prevent falsification or unfair use of the electronic money, both the user's terminal 20 and the synchro server 30 store and manage the reference number of the electronic money when the electronic money is deposited in the user's terminal 20. The use of the electronic money is allowed only when the reference number of the electronic money used by the user's terminal 20 is coincident with that stored in the synchro serve 30 to correspond to the user's terminal 20.

The same number is not used continuously as the reference number. Instead, the reference number is updated at regular intervals. Each of the user's terminal 20 and the synchro server 30 stores the initial value of the reference number and the rule for updating the reference number, and updates the reference number at regular intervals. There is no transmission of the updated reference number between the user's terminal 20 and the synchro server 30.

The user's terminal 20 and the synchro server 30 repeatedly update the reference number from the initial value based on the update rule independently of each other. In a case where the update is performed, for example, every one minute, the reference number n minutes after the time at which the electronic money was deposited in the user's terminal 20 can be determined uniquely from the initial value and the update rule by storing the time of deposit as a start time in both the user's terminal 20 and the synchro server 30.

Without knowledge of the initial value and update rule of the reference number, a person other than the user cannot find the reference number that the user's terminal 20 and the synchro server 30 use. Therefore, it is possible to prevent unfair use of the electronic money by the register terminal 10 using the user's terminal number of the user's terminal 20.

Moreover, it is also possible to prevent the falsification and the use of the electronic money by another person who pretends to be the user of the user's terminal 20 by using the user's terminal number of the user's terminal 20.

An example of the update rule of the reference number is described. FIG. 12 explains an exemplary update rule of the reference number. As the initial number, a square root that is an irrational number is used. In this update rule, the n-th decimal place number of the square root is used as the reference number n minutes after the start time. The calculation of decimal places may be cut at an appropriate decimal place so that the number used in the update rule goes back to the first decimal place. In FIG. 12, square roots of 2, 3, 5 and 6 are used and the reference number n minutes after the start time is expressed by the n-th decimal place number of the respective square root.

In the above description, the reference number n minutes after the start time is determined while the time of deposit of the electronic money is considered as the start time. Instead of the time that has passed after the start time, the number of times of use of the electronic money may be used for updating the reference number. More specifically, in a case where the number of times the electronic money was used after the electronic money was deposited is n, the n-th decimal place number is used as the reference number.

In the case of updating the reference number using the time that has passed after the time of deposit of the electronic money, it is necessary to synchronize the clocks between the user's terminal 20 and the synchro server 30. However, in the case of updating the reference number in accordance with the number of times the electronic money is used, the clock synchronization is not necessary.

Figures 13, 14:
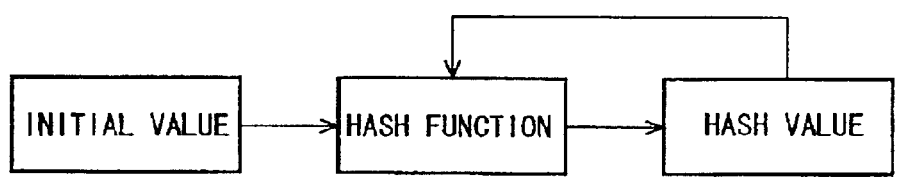
FIG. 13 explains another exemplary update rule for the reference number according to the present invention.
FIG. 14 explains still another exemplary update rule for the reference number.

FIG. 13 explains another exemplary update rule. In this update rule, an algorithm for generating a random number sequence is used. A seed of the random number generation is given as the initial value, and the n-th number in the random number sequence continuously generated is used as the reference number n minutes after the start time or that in the n-th uses. As a generation routine of the random number sequence, a typical random number algorithm for generating normal random numbers or uniform random numbers can be used. Exemplary sequences of the reference numbers generated by using the random number generation algorithm are shown in FIG. 13. When the seed of the random number generation is changed, the series of generated random numbers is also changed. Therefore, without the initial value of the random value and the random number generation algorithm, the reference number cannot be estimated.

By determining in advance a specific random number generation algorithm as the update rule in both the user's terminal 20 and the synchro server 30, the n-th reference number can be calculated uniquely from the seed of the random number generation given as the initial value.

FIG. 14 explains still another example of the update rule. In this example, Hash function $y=h(x)$ is used as the update rule. The initial value is given as the input of Hash function $h(x)$, and then a Hash value y is obtained as the output. This output is used as the reference number one minute after the start time. Then, Hash value y is given as the input to Hash function, so as to obtain a new Hash value y. The new Hash value y is used as a two-minute-after reference number. By repeating these processes, Hash values are obtained one after another in accordance with Hash function and are then used as the reference numbers.

As Hash function, unidirectional Hash function may be used. The unidirectional Hash function is Hash function for which it is difficult to obtain the value x that provides the function value y in accordance with h(x)=y from the function value y. By using the one directional Hash function, it becomes difficult to estimate the Hash function even if the sequence of the generated reference numbers is examined. Therefore, reference numbers with improved security can be generated.

By determining in advance the specific Hash function as the update rule in both the user's terminal 20 and the synchro server 30, a reference number n minutes after the start time can be calculated uniquely from the initial value.

As described above, when the user newly withdraws electronic money from the user's bank account or credit card account and deposits the electronic money in the user's terminal 20, it is checked whether or not the balance of the electronic money already stored in the user's terminal 20 is equal to the balance of the electronic money of the user that the synchro server 30 stored in the deposit database 56. This enables the detection of unfair use by disagreement of the balances in a case where the electronic money was unfairly used.

Next, the phase of checking the balance of the electronic money is described. When the user inquires the balance of the electronic money stored in the user's terminal 20, the balance of the electronic money can be checked with the balance of the electronic money that the synchro server 30 stored in the deposit database 56.

Figure 15:
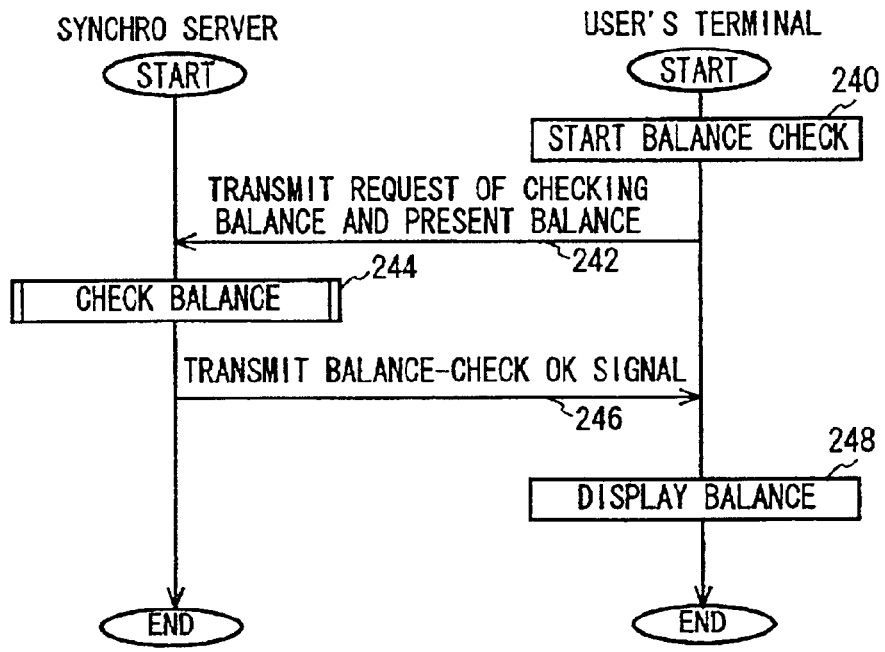
FIG. 15 is a flowchart of a balance inquiry by the user's terminal 20 in FIG. 1.

FIG. 15 is a flowchart of the balance inquiry by the user's terminal 20. When the user selects the balance inquiry from the menu of the electronic money system of the user's terminal 20 (Step 240), the user's terminal 20 transmits a request of the balance inquiry and the present balance of the electronic money stored in the user's terminal 20 to the synchro server 30. The synchro server 30 checks the balance received from the user's terminal 20 with the balance of the electronic money of that user's terminal 20 that was stored by the synchro server 30 in the deposit database 56 (Step 244).

The process of the balance inquiry in Step 244 is the same as the process of the balance inquiry in Step 214 shown in FIG. 8. If the balances under check are not coincident, there is a possibility of unfair use of the electronic money. Therefore, the use of the electronic money is stopped. If the balances are coincident with each other, the synchro server 30 transmits the balance-check OK signal to the user's terminal 20 (Step 246), and then the user's terminal 20 displays the balance of the electronic money stored in the user's terminal 20 (Step 248).

In a case where the user has inquired the balance of the electronic money, it is not always necessary for the user's terminal 20 to check the balance with the balance in the synchro server 30. Because the check of the balance requires communication with the synchro server 30, the times of the balance inquiry may be reduced in order to reduce the communication cost. For example, the balance inquiry may be performed only when a predetermined time, for example, three days have passed after the last balance inquiry by the user.

By the function of checking the balance of the electronic money when the user has inquired the balance, it is possible to prevent unfair use of the electronic money in which the user did not use the electronic money, and it is also possible to prevent time passing before the user realizes the unfair use.

In the above example, the balance is checked when the user inquired the balance. However, the balance may be checked by allowing the user's terminal 20 to voluntarily communicate with the synchro server 30 when the electronic money has not been used for a long time. As a trigger for causing the user's terminal 20 to check the balance, the fact that a predetermined number of days have passed after the time of deposit the electronic money may be used, for example.

Figure 16:
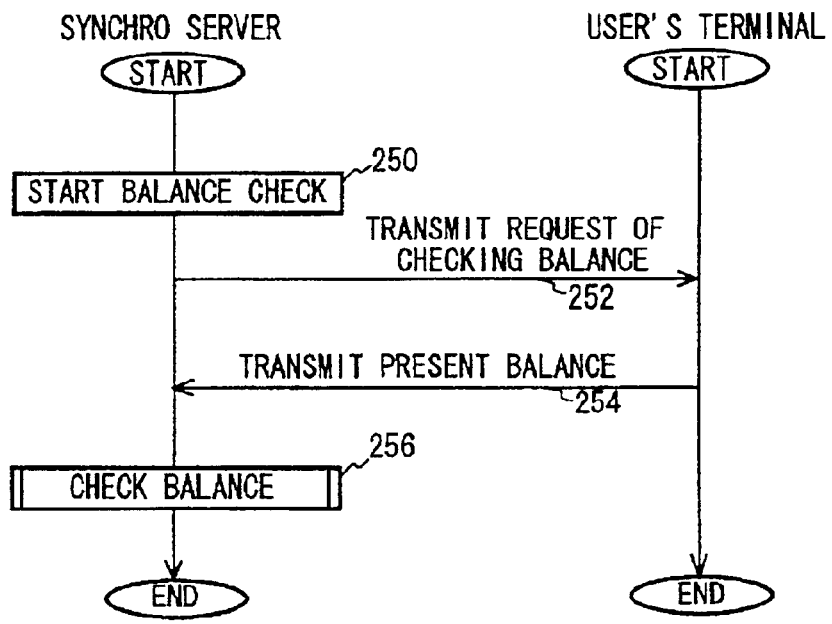
FIG. 16 is a flowchart of a balance inquiry by the synchro server 30 in FIG. 1.

FIG. 16 is a flowchart of the balance inquiry by the synchro server 30. In the flowchart shown in FIG. 15, the balance check is performed when the user of the user's terminal 20 starts the balance inquiry. However, in the flowchart shown in FIG. 16, the balance check is started when the synchro server 30 starts the balance inquiry. The synchro server 30 voluntarily checks the balance of the electronic money of the specific user's terminal 20 with the balance of the electronic money managed by the synchro server 30 in a case where the term of validity of the electronic money has expired, a case where the electronic money is suspected to be unfairly used, or the like. In this way, the synchro server 30 can automatically make the examination of the electronic money that is suspected to be unfairly used to perform the balance check.

Figure 17:
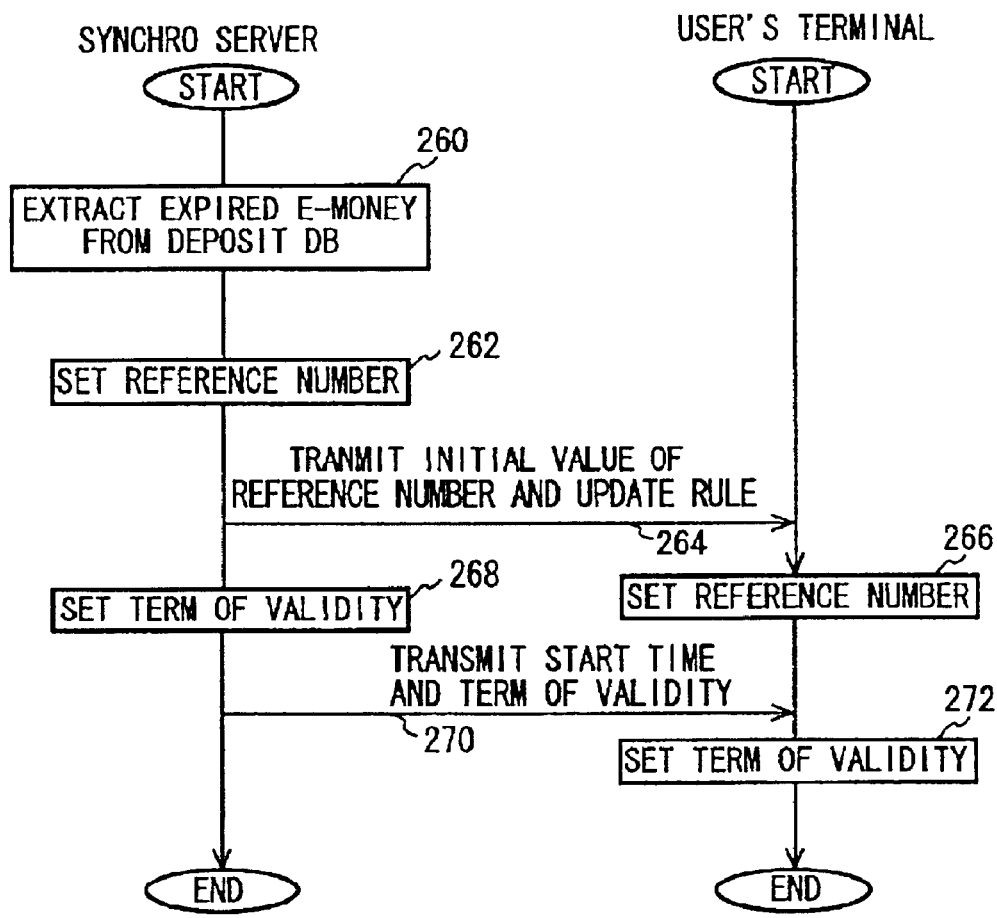
FIG. 17 is a flowchart of an update process for electronic money having an expired term of validity by the synchro server 30 in FIG. 1.

FIG. 17 is a flowchart of an update process of the electronic money for which the term of validity has expired, performed by the synchro server 30. The synchro server 30 extracts the expired electronic money from the deposit database 56 (Step 260).

The synchro server 30 resets the reference number of the extracted electronic money (Step 262). Then, the synchro server 30 newly determines the initial value of the reference number and also sets the update rule for updating the reference number. The synchro server 30 transmits the initial value and update rule of the reference number thus set to the user's terminal 20 for storing the electronic money (Step 264).

The user's terminal 20 sets the reference number based on the initial value and update rule that were received (Step 266). The synchro server 30 resets the term of validity of the electronic money (Step 268). Also, the start time and the term of validity of the electronic money are newly determined and then are recorded in the deposit database 56. The synchro server 30 then transmits the start time and term of validity thus set to the user's terminal 20 (Step 270). The user's terminal 20 sets the start time and term of validity that were received for the electronic money, and records them (Step 272).

As described above, the electronic money for which the term of validity has expired can be made valid again by resetting the reference number and using the reference number with the new initial value and update rule. This is more advantageous as compared with a case where the expired electronic money can be no longer be used and therefore the user has to deposit electronic money again, because the user's burden is reduced. Moreover, also in a case of using the electronic money while the term of validity is set to be relatively short and the update rule is changed in order to ensure the safety, this is advantageous in that the electronic money can be continuously used without burdening the user.

Figure 18:
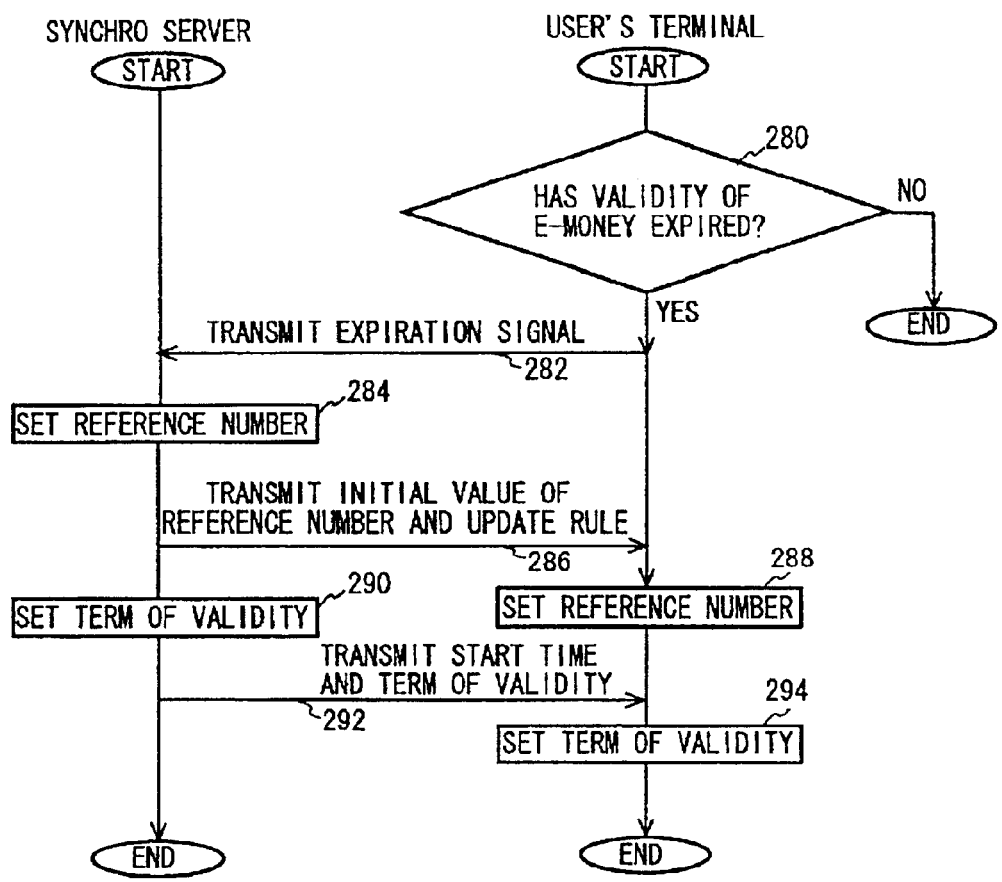
FIG. 18 is a flowchart of an update process for electronic money having an expired term of validity by the user's terminal 20 in FIG. 1.

FIG. 18 is a flowchart of an update process of the expired electronic money by the user's terminal 20. In the flowchart shown in FIG. 17, the synchro server 30 extracts the expired electronic money and performs the update process of the electronic money of the user's terminal 20 that stores the expired electronic money. On the other hand, the flowchart shown in FIG. 18 is different from that shown in FIG. 17 in that the user's terminal 20 detects the expiration of the electronic money stored therein, notifies the detection result and makes the synchro server 30 perform the update process of the electronic money.

The user's terminal 20 checks whether or not the term of validity of the electronic money has expired (Step 280), and then transmits expiration signal if the term of validity has expired (Step 282). The synchro server 30 detects the user's terminal number of the user's terminal 20, extracts information regarding the electronic money of the user's terminal 20 managed by the synchro server 30, and then performs a change of the reference number and reset of the term of validity. The process of the change of the reference number and the process of resetting the term of validity (Steps 284 to 294) are the same as those in Steps 262 to 272 in FIG. 17 and therefore a description is omitted here.

Figure 20:
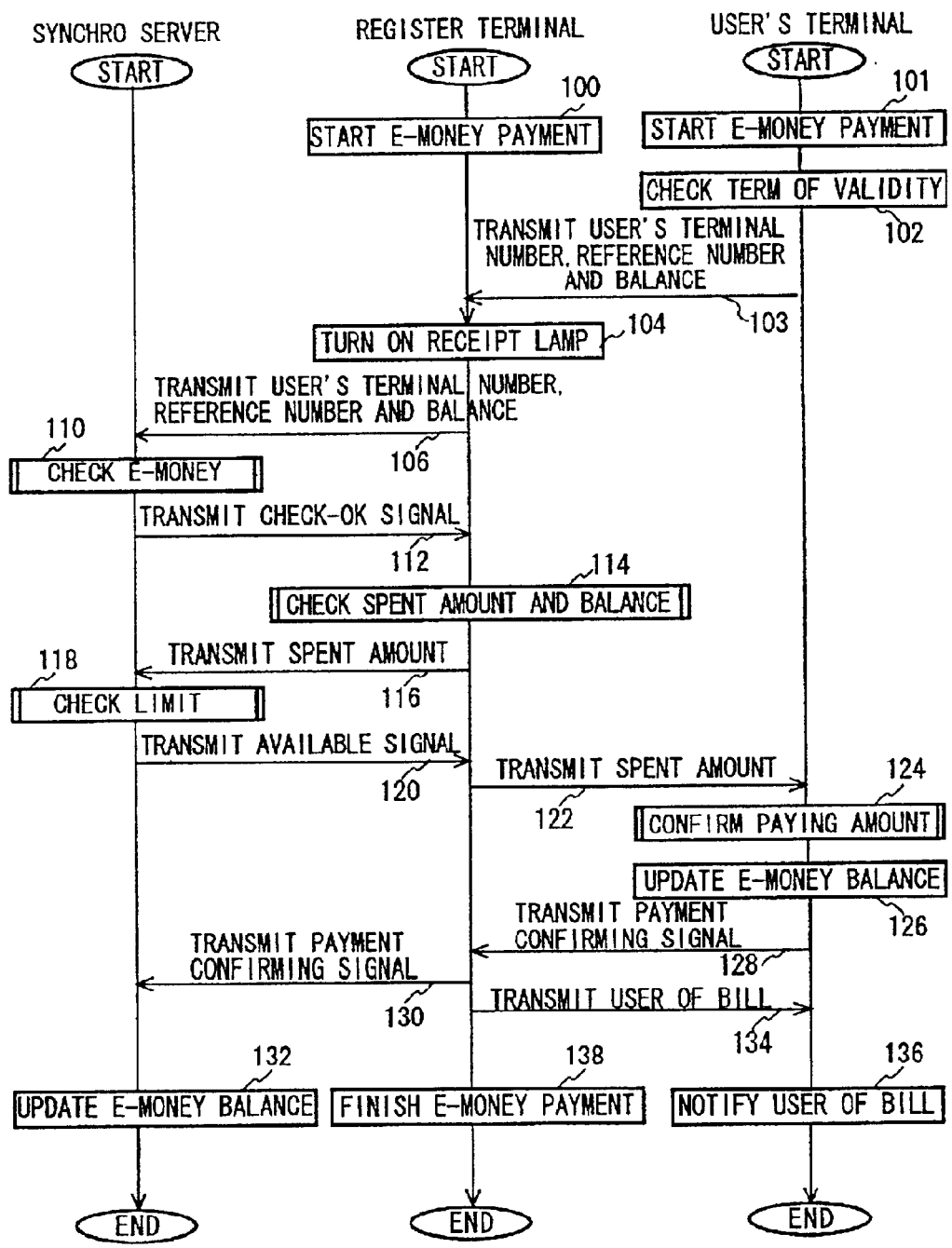
FIG. 20 is a flowchart of an electronic money payment process of the electronic payment system according to the first embodiment of the present invention.
Figure 24:
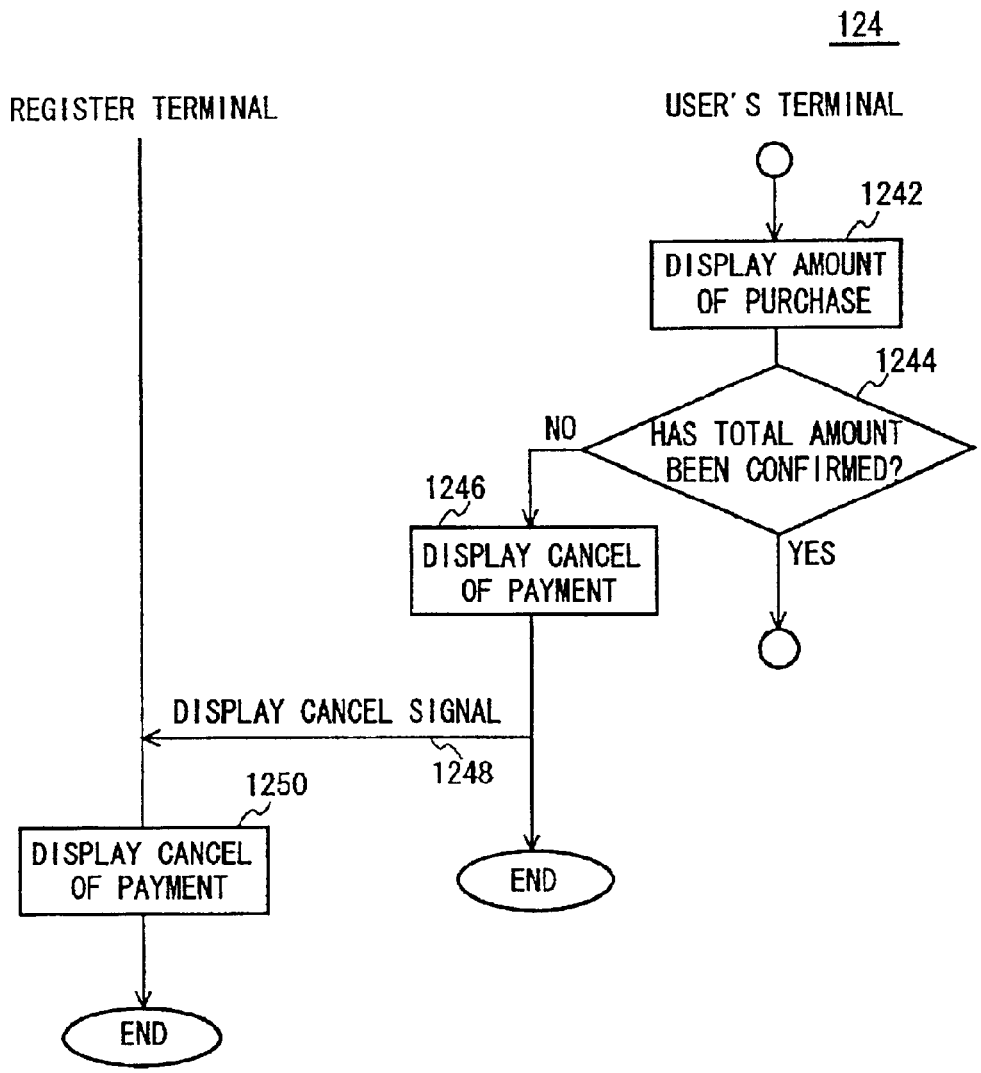
FIG. 24 is a flowchart of a paying amount confirmation process 124 in FIG. 20.
Figure 25:
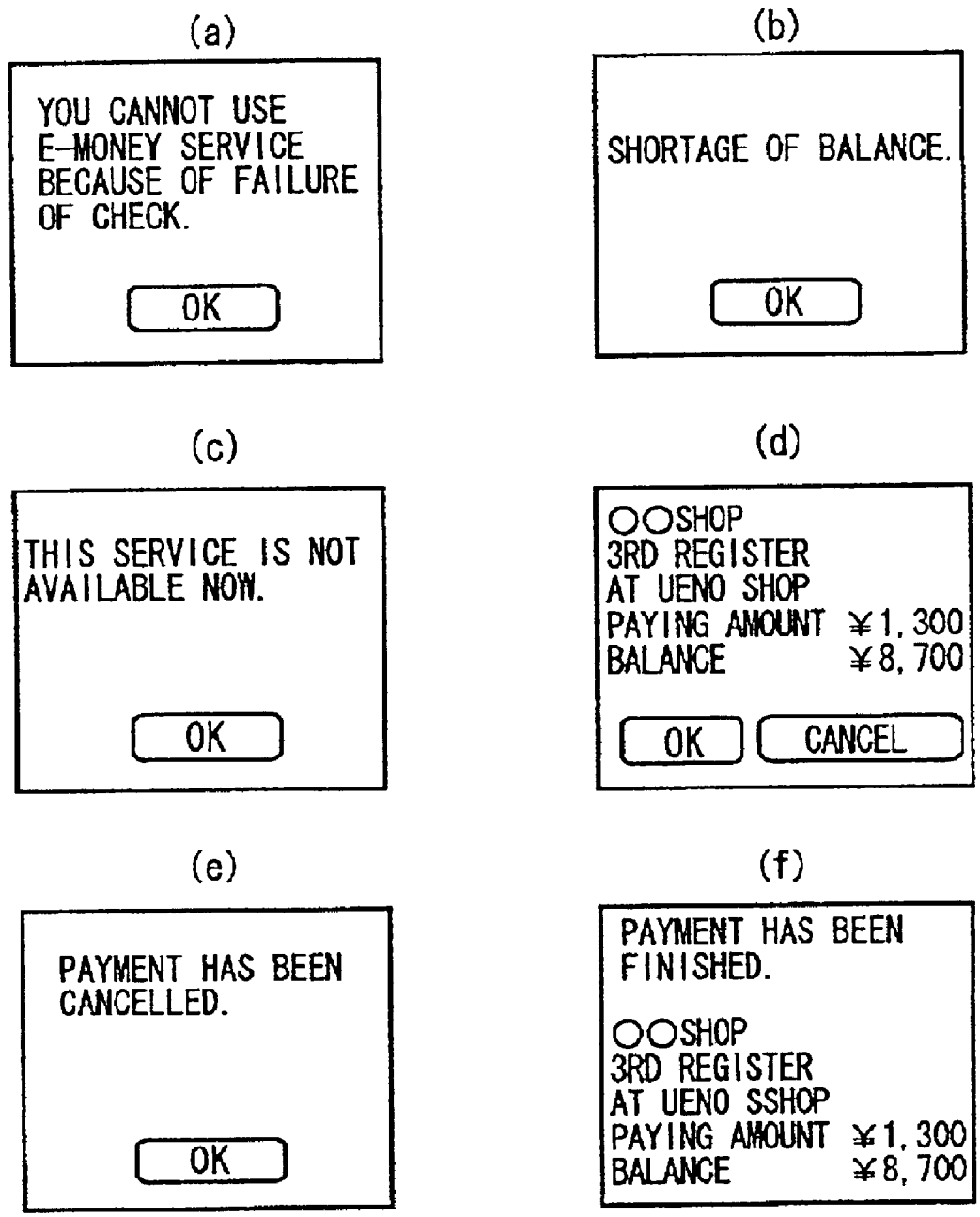
FIGS. 25A–25F show further exemplary screens of the display 802 of the user's terminal 20 in FIG. 1.

Next, the phase in which the user uses electronic money and pays by the electronic money is described. FIG. 20 is a flowchart of an electronic money payment process of the electronic payment system of the present embodiment. FIGS. 21–24 are flowcharts of details of the process in FIG. 20. FIG. 25 shows an exemplary display screen of the display 802 of the user's terminal 20. FIG. 26 shows an exemplary display screen of the register-side display 702 of the register terminal 10.

Referring to FIG. 20, the electronic money payment process is described. At the retail store, the user buys the goods and pays for the goods at the register placed at the retail store. The clerk handling the register is requested to process the payment by electronic money from the user and then selects the electronic money payment menu on the register terminal 10, thereby starting the electronic money payment process (Step 100). The user selects the electronic money payment menu on the user's terminal 20, thereby starting the electronic money payment (Step 101). The user's terminal 20 checks whether or not the term of validity of the electronic money stored in the user's terminal 20 has expired (Step 102).

In a case where the term of validity of the electronic money has expired, a screen indicating the electronic money cannot be used is displayed on the user's terminal 20. After confirming that the term of validity has not expire, the user's terminal 20 communicates with the register terminal 10 so as to transmit the user's terminal number and the reference number and balance of the electronic money (Step 103). For the communication between the register terminal 10 and the user's terminal 20, infrared communication or short-distance wireless communication can be used. The register terminal 10 turns on the receipt lamp in order to notify the user and the clerk of the start of the communication with the user's terminal 20 (Step 104).

The register 10 terminal accesses the synchro server 30 and transmits the user's terminal number and the reference number and balance of the electronic money that were received from the user's terminal 20 (Step 106). When the register terminal 10 has accessed the synchro server 30, the synchro server 30 may search the register database 50 for information such as a terminal number of the register terminal so as to confirm whether or not the register terminal 10 has been already registered and refuse access to a non-registered register terminal. Moreover, the synchro server 30 may refuse access from a phone number other than a specific caller number by checking the caller number when the register terminal 10 accesses the communication port.

Figure 21:
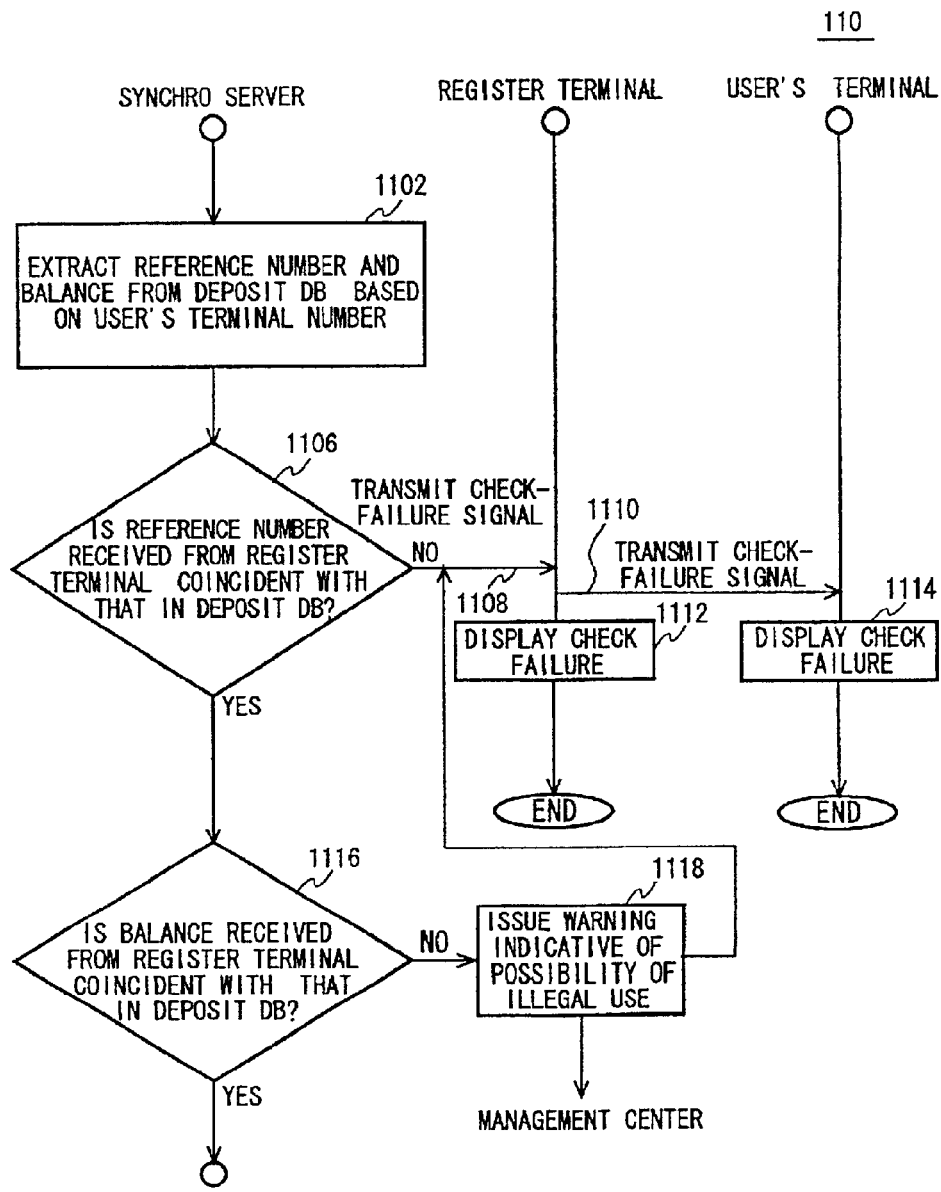
FIG. 21 is a flowchart of an electronic money check process 110 in FIG. 20.

The synchro server 30 checks or validates the electronic money based on the user's terminal number and the reference number of the electronic money and balance of the electronic money that were received from the register terminal 10 (Step 110). Referring to FIG. 21, the process of checking the electronic money in Step 110 is described. The synchro server 30 searches the deposit database 56 based on the user's terminal number and extracts the reference number and balance of the electronic money used by the user's terminal 20 (Step 1102). The synchro server 30 compares the reference number received from the register terminal 10 with the reference number extracted from the deposit database 56 so as to check whether or not they are coincident with each other (Step 1106).

In a case where they are not coincident, the synchro server 30 transmits a check-failure signal to the register terminal 10 (Step 1108). The register terminal 10 sends the check-failure signal to the user's terminal 20 (Step 1110) and then displays a screen shown in FIG. 26A that indicates the electronic money cannot be used (Step 1112), thereby finishing the process. The user's terminal 20 displays a screen shown in FIG. 25A that indicates that the electronic money cannot be used because of the failure in check, on the display of the user's terminal 20 (Step 1114), thereby finishing the process.

In a case where the check of the reference number was successful in Step 1106, the synchro server 30 compares the balance received from the register terminal 10 with the balance extracted from the deposit database 56 so as to check whether or not they are coincident with each other (Step 1116). In a case where they are not coincident, there is a possibility that the electronic money was unfairly used. Thus, a warning message indicating the possibility of unfair use is sent to the management center (Step 1118). The synchro server 30 transmits the check-failure signal to the register terminal 10 (Step 1108). In a case where the balance check was successful, the synchro server 30 starts the next process.

Figure 22:
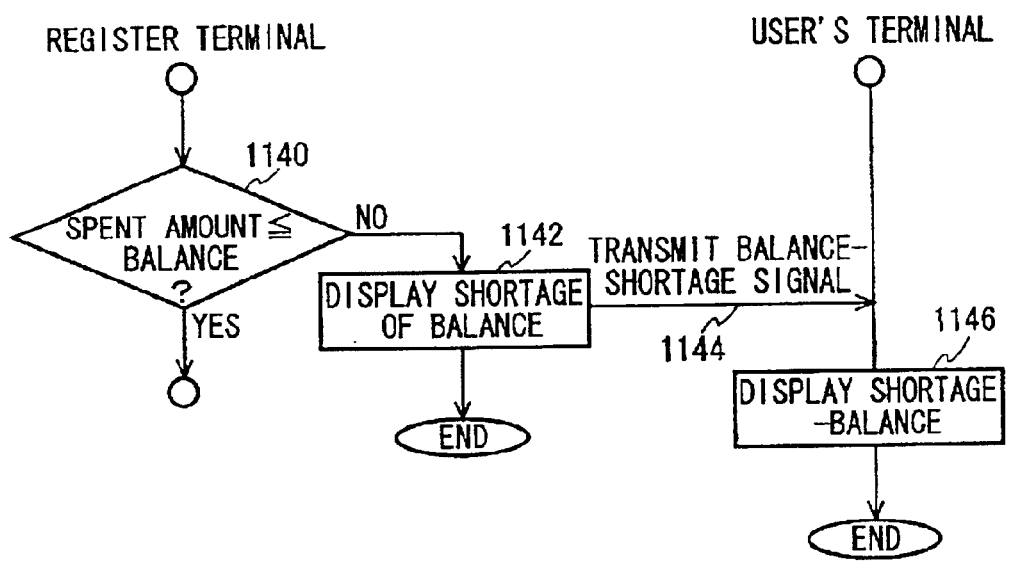
FIG. 22 is a flowchart of a process 114 in FIG. 20 for checking a spent amount and balance.

Returning to FIG. 20, the synchro server 30 transmits a check-OK signal to the register terminal 10 when the process of checking the electronic money in Step 110 has been finished (Step 112). The register terminal 10 checks the spent amount and balance of the electronic money when receiving the check-OK signal (Step 114). Referring to FIG. 22, the process of Step 114 of checking the spent amount and balance of the electronic money is described. The clerk handling the register terminal 10 calculates the total of the purchase amount of the user by means of the register terminal 10 and calculates the spent amount of the electronic money.

The register terminal 10 checks whether or not the balance received from the user's terminal 20 is larger than the spent amount (Step 1140). When the balance does not cover the spent amount, the register terminal 10 displays a screen shown in FIG. 26B on the display of the register terminal 10 so as to notify the clerk of the shortage of the balance (Step 1142). The register terminal 10 transmits a balance-shortage signal to the user's terminal 20 (Step 1144). The user's terminal 20 displays a screen shown in FIG. 25B so as to notify the user of the shortage of the balance (Step 1146).

Returning to FIG. 20, the register terminal 10 transmits the spent amount to the synchro server 30 after confirming that the balance covers the spent amount (Step 116). The synchro server 30 confirms any limitation on the use of the electronic money when receiving the spent amount (Step 118).

The limitation on the use of the electronic money is to limit the use of the electronic money during a predetermined time period after the last use of the electronic money, for example, for one minute after the last use, and to make the electronic money, for which the term of validity after the time of deposit of the electronic time has expired, unavailable.

The reason why successive uses of the electronic money in a short period are limited is to prevent unfair use of the electronic money of the user's terminal 20 by the register terminal 10 immediately after the register terminal 10 processed the previous electronic money payment for the user's terminal 20. In a case where the reference number is updated, for example, every one minute, the reference number is not updated for a next use within one minute after the previous use. Therefore, the register terminal 10 can process the payment by the electronic money by using the same reference number as that received from the user's terminal 20 without approval of the user's terminal 20. Thus, even if the measure against unfair use that uses the reference number is done, the electronic money can be used unfairly. Thus, successive uses of the electronic money within a predetermined period has to be limited.

Figure 23:
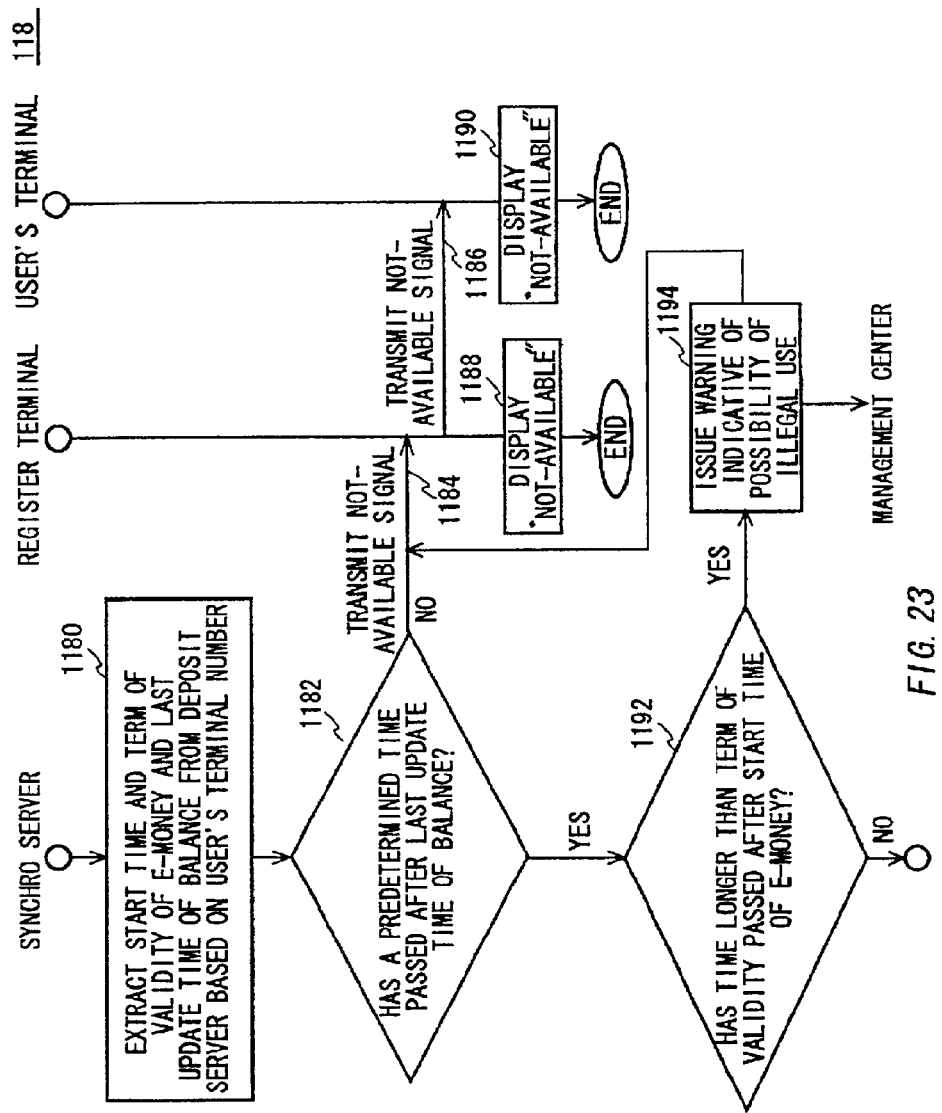
FIG. 23 is a flowchart of a limit check process 118 in FIG. 20.

Referring to FIG. 23, the process of Step 118 of checking the limitation on the use of the electronic money is described. The synchro server 30 searches the deposit database based on the user's terminal number and then extracts the start time, the last time at which the balance was updated, and the term of validity for the electronic money of the user's terminal 20 (Step 180). The synchro server 30 checks whether or not a predetermined time, for example, one minute has passed after the last update time of the balance (Step 1182), and transmits a not-available signal to the register terminal 10 when the predetermined time has not passed (Step 1184).

The register terminal 10 sends the not-available signal to the user's terminal 20 (Step 1186) and displays a screen shown in FIG. 26C on the display of the register terminal 10, indicating that the electronic money cannot be used (Step 1188), thereby finishing the process. The user's terminal 20 displays a screen shown in FIG. 25C on the display of the user's terminal 20, indicating that the electronic money cannot be used (Step 1190), thereby finishing the process.

In a case where the predetermined time has passed after the last update time of the balance, it is determined whether the time that has passed after the start time of the electronic money goes beyond the term of validity (Step 1192). The user's terminal 20 checks whether or not the term of validity has expired when the electronic money is used in the process of Step 102 of checking the term of validity in FIG. 20, and then makes the expired electronic money unavailable. Thus, the synchro server 30 is sure to receive no request of payment by expired electronic money and therefore the detection of expired electronic money in this process (Step 1192) indicates that the electronic money may be unfairly used. In this case, the synchro server 30 sends the warning message indicating the possibility of unfair use to the management center (Step 194) and transmits the not-available signal to the register terminal 10 (Step 1184).

Returning to FIG. 20, when the synchro server 30 has finished the process of Step 118 of checking any limitation on the use of the electronic money and confirms that the use of the electronic money is not limited, the synchro server 30 transmits an available signal to the register terminal 10 (Step 120). The register terminal 10 sends the spent amount of the electronic money to the user's terminal 20 (Step 122). The user's terminal 20 then confirms the paying amount (Step 124). Referring to FIG. 24, the process of Step 124 of confirming the paying amount is described. The user's terminal 20 displays the total amount of the purchase by a screen shown in FIG. 25D (Step 1242).

The user confirms the total amount of the purchase (Step 1244), and selects an OK button in a case where the user proceeds with the payment by electronic money. In a case where the user wants to cancel the payment, a cancel button is selected. When the cancel button is selected, the cancel of the payment is shown by displaying a screen shown in FIG. 25E (Step 1246). The user's terminal 20 then transmits a cancel signal to the register terminal 10 (Step 1248), thereby finishing the process. When receiving the cancel signal, the register terminal 10 displays the cancel of the payment by a screen shown in FIG. 26D (Step 1250), thereby finishing the process.

Returning to FIG. 20, the user's terminal 20 subtracts the paying amount from the balance of the electronic money so as to update the balance, and then records the new balance (Step 126). The user's terminal 20 transmits a payment confirming signal to the register terminal (Step 128). The register terminal 10 transmits the payment conforming signal to the synchro server 30 (Step 130) and also transmits a bill to the user's terminal 20 (Step 134), thereby finishing the process. When receiving the payment confirming signal from the register terminal 10, the synchro server 30 updates the balance of the electronic money stored in the deposit database 56 (Step 132), thereby finishing the process. The user's terminal 20 receives the bill from the register terminal 10, and displays the bill by a screen shown in FIG. 25F (Step 136).

In the above payment process, the term of validity is checked when the user's terminal 20 uses the electronic money, and therefore the user cannot use the electronic money in a case where the term of validity has expired. It is preferable that the user is notified that the term of validity has expired before the user uses the electronic money. The user's terminal 20 may be configured so that an alarm indicating the term of validity has expired is displayed on the display when the term of validity of the electronic money has expired. In this way, the user can update the electronic money before the use of the electronic money. Moreover, also in a case where the electronic money is short, a similar alarm may be displayed by the user's terminal 20. In this way, the user can withdraw more electronic money before the user uses the electronic money.

In the above payment process, the user's terminal 20 transmits the payment confirming signal after updating the balance of electronic money. At the time at which the payment confirming signal is further sent from the register terminal 10 to the deposit database 56, the synchro server 30 updates the balance of electronic money in the deposit database 56. However, in a case where the communication between the user's terminal 20 and the register terminal 10 is in a bad condition, the payment confirming signal cannot be set from the user's terminal 20 to the register terminal 10 after the user's terminal updated the balance of electronic money, so that the payment is likely to be cancelled.

In such a case, there may arise an inconsistency in the balance of electronic money stored in the synchro server 30 with the balance of electronic money stored in the user's terminal 20. Thus, before the user's terminal 20 updates the balance of electronic money, the user's terminal 20 transmits the payment confirming signal to the register terminal 10, and the register terminal 10 sends back a confirming signal that confirms that the payment confirming signal from the user's terminal 20 was received. The user's terminal 20 updates the balance of electronic money in a case where the user's terminal 20 received the confirming signal from the register terminal 10. In this way, it is possible to prevent disagreement of the balance of electronic money between the user's terminal 20 and the synchro server 30.

In the electronic money payment system of the present embodiment, it is possible to prevent unfair use by checking the balance and reference number of the electronic money stored in one of the user's terminal 20 and the synchro server 30 with those stored in the other when the deposit of electronic money, the balance inquiry and the payment are performed. Other than the above, a mechanism is provided for checking inconsistency of electronic money by an automated check of the electronic money by the synchro server 30.

The synchro server 30 may search the deposit database 56 so as to extract electronic money for which the term of validity has expired and may check up the payment records, the log of uses, records of deposits and withdrawals in the user's account database 70 so as to check the existence of any inconsistency. Moreover, the synchro server 30 may communicate with the user's terminal 20 that deposited electronic money if necessary, to inquire the balance recorded in that user's terminal 20, so that the balance in that user's terminal 20 is compared with the balance recorded in the deposit database 56.

In the description of the above payment process, after receiving the payment confirming signal from the register terminal 10, the synchro server 30 may extract a part of attribute information related to the user of the user's terminal 20 that made this payment from the user database 60 and transmit the extracted information to the register terminal 10. The user's attribute information transmitted to the register terminal 10 is information regarding attributes of the user, such as sex or age. It is preferable that this attribute information not contain personal information such as name, address and a credit card number.

The register terminal 10 may acquire the information related to the user who made this payment and accumulate the detail of the goods purchased and the user information as a purchase history in a database of the retail store. Therefore, the retail store can extract the purchase action of the user such as an age bracket of user's who purchase a certain item, from the purchase history information accumulated in the database, so that the retail store can use the extracted information for marketing.

Although the synchro server 30 receives the spent amount of electronic money from the register terminal 10, the synchro server 30 may receive detailed information regarding the purchased item such as the name or unit price together with the spent amount and record the received information in the user database 60 as the user's purchase history. In this manner, the user's terminal 20 can inquire the user's purchase history to the synchro server 30 and receive the purchase history from the synchro server 30.

The functions and operations of the payment process of the electronic money payment system of the present embodiment are described above. If any trouble of communication occurs in the transactions of the aforementioned payment, for example, the stop of communication, the information involved with all the processes, temporal data and the like are initialized, thereby finishing the process.

In the above payment process of FIG. 20, the process of checking electronic money in Step 110, the confirming process of the spent amount limit in Step 118 and the process of updating the balance of electronic money in Step 132, that are performed by the synchro server 30, are handled by the payment processing unit 82, the operation unit 81 and the database retrieving unit 88 of the synchro server 30.

The communication such as the receipt in Step 106 of the user's terminal number, the reference number and the balance from the register terminal 10, the transmission in Step 112 of the check-OK signal to the register terminal 10, the receipt in Step 116 of the spent amount from the register terminal 10, the transmission in Step 120 of the available signal to the register terminal 10 and the receipt in Step 130 of the payment confirming signal from the register terminal 10, that are data communication performed by the synchro server 30 with the register terminal 10, are handled by the first communication unit 84 of the synchro server 30.

In the electronic payment system of the present embodiment, both the user's terminal 20 and the synchro server 30 store the balance and reference number and check up the balances and reference numbers with each other. Therefore, it is possible to detect unfair use, thereby realizing the electronic payment process using electronic money with high reliability. Moreover, the mobile phone and the hand-held device that can perform communication by being connected to the mobile phone or the like have portability that the user can carry them everywhere and convenience that the communication can be performed by using wireless telecommunication everywhere. Thus, the electronic payment system of the present embodiment enables safe and convenient electronic payment with high reliability.

(Embodiment 2) The electronic payment system according to a second embodiment of the present invention is described. In the electronic payment system according to the present embodiment, the payment on the purchased goods can be made by electronic money when the user buys the goods from a vending machine.

The electronic payment system of the present embodiment has the same structure as that in the first embodiment except that a vending machine is used as the claiming or demanding terminal in place of the register terminal 10 and therefore a detailed description is omitted here.

Figure 27:
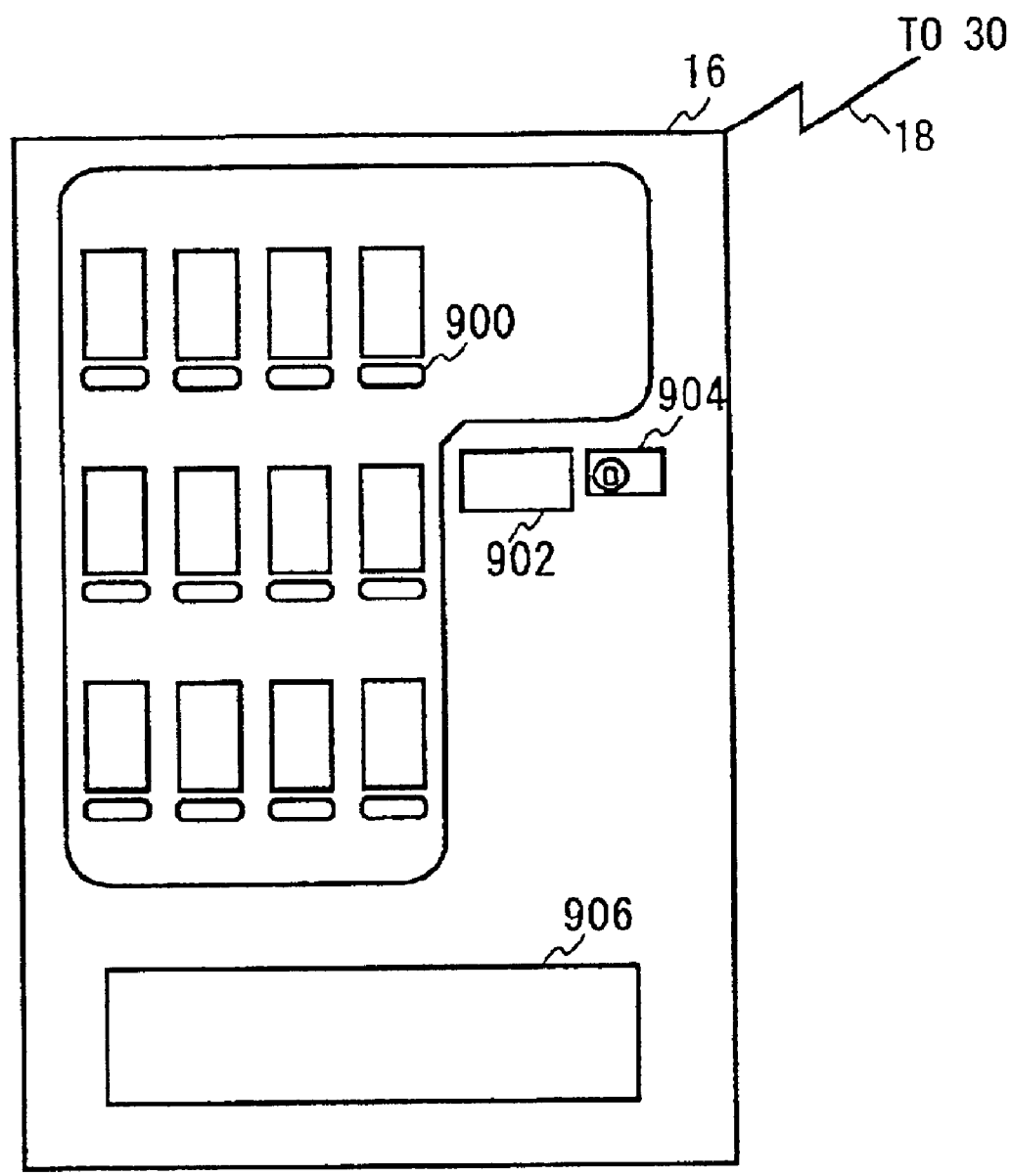
FIG. 27 shows an appearance of a vending machine 16 in an electronic payment system according to a second embodiment of the present invention.

FIG. 27 shows an appearance of a vending machine 16 of the present embodiment. The vending machine 16 has buttons 900 for allowing selection of items, a short-distance communication unit 902, a coin insertion part 904 through which a coin can be inserted, and a discharge opening 906 for the purchased item. The short-distance communication unit 902 performs communication by infrared communication or short-distance wireless communication with a short-distance communication unit of the user's terminal 20. The vending machine 16 can communicate with the synchro server 30 via the communication line 18. As the communication method from the vending machine 16 to the synchro server 30, any communication technique of communication via a telephone line, communication via a private line and wireless telecommunication may be used.

The electronic money payment process of the present embodiment is the same as the payment process of the first embodiment except that the purchased item is discharged through the discharge opening 906, and therefore the detailed description thereof is omitted here.

(Embodiment 3) The electronic payment system according to a third embodiment of the present invention is described. In the electronic payment system according to the present embodiment, the user can pay for a parking fee by electronic money at a gate when entering a parking lot or exiting from the parking lot.

The electronic payment system of the present embodiment has the same structure as that in the first embodiment except that a parking fee collecting machine is used as an exemplary claiming or demanding terminal and therefore a detailed description of the same structure is omitted here.

Figure 28:
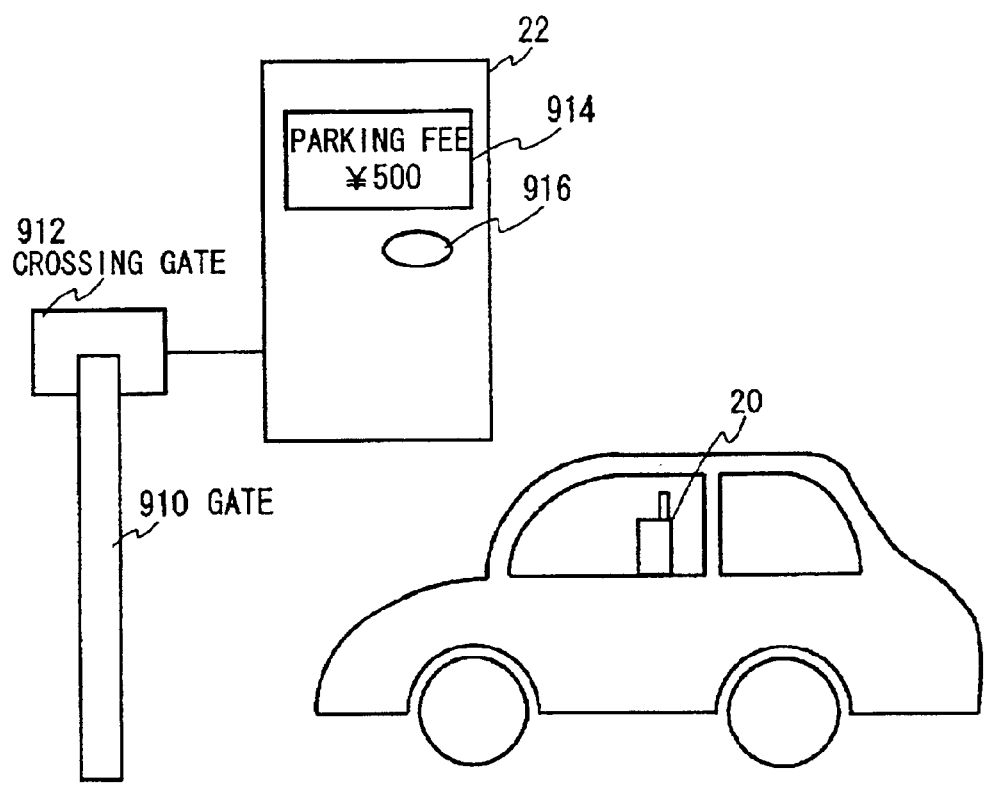
FIG. 28 shows an appearance of a parking fee collecting machine in an electronic payment system according to a third embodiment of the present invention.

FIG. 28 shows an appearance of a parking fee collecting machine 22 of the present embodiment. The parking fee collecting machine 22 has a display 914 for displaying the parking fee, a short-distance communication unit 916 for communicating with the short-distance communication unit of the user's terminal 20, a gate 910, and a crossing gate 912. In addition, the parking fee collecting machine 22 includes a part operable to communicate with the synchro server 30 via a telephone line, a private line or wireless communication.

The electronic money payment process of the present embodiment is the same as the payment process of the first embodiment except that the gate opens after the payment by the electronic money has been finished, and therefore a detailed description is omitted here.

(Embodiment 4) The electronic payment system according to a fourth embodiment of the present invention is described. In the electronic payment system of the present embodiment, the user can pay for railway fare by electronic money at a ticket gate.

Figure 29A:
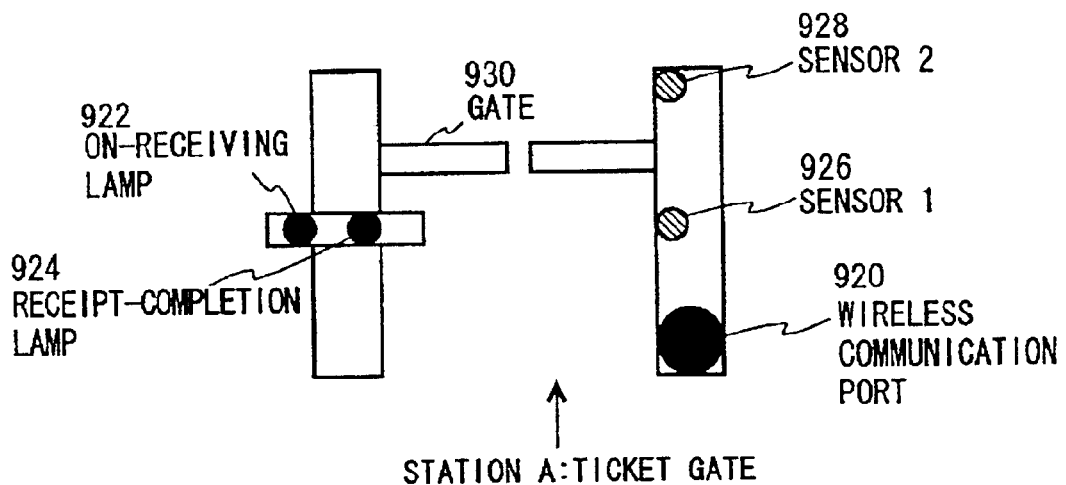
FIGS. 29A–29B show an appearance of a ticket inspector in an electronic payment system according to a fourth embodiment of the present invention.
Figure 29B:
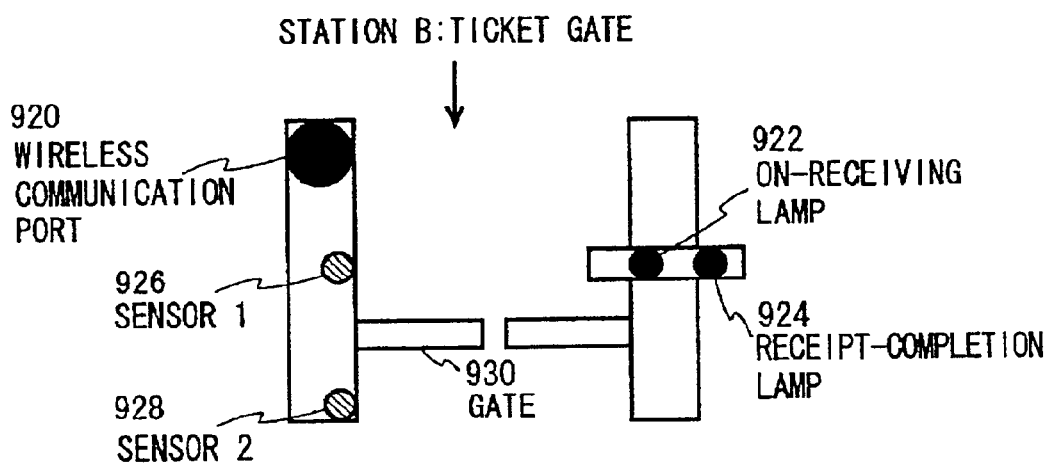

In the electronic payment system of the present embodiment, a ticket inspector is used as an example of the claiming terminal. FIGS. 29A–29B show an appearance of the ticket inspector 12. The ticket inspector 12 includes a wireless communication port 920 for communicating with a short-distance communication unit of the user's terminal 20 of the user, an on-receiving lamp 922 for indicating a status of the communication with the user's terminal 20, a receipt-completion lamp 924, the first sensor 926 for detecting that the user passes through the gate, the second sensor 928 and the gate 930. It is assumed that the user passes through the ticket gate at Station A, gets on a train, gets off the train at Station B, passes through the ticket gate at station B and pays for the fare by electronic money.

Figure 30:
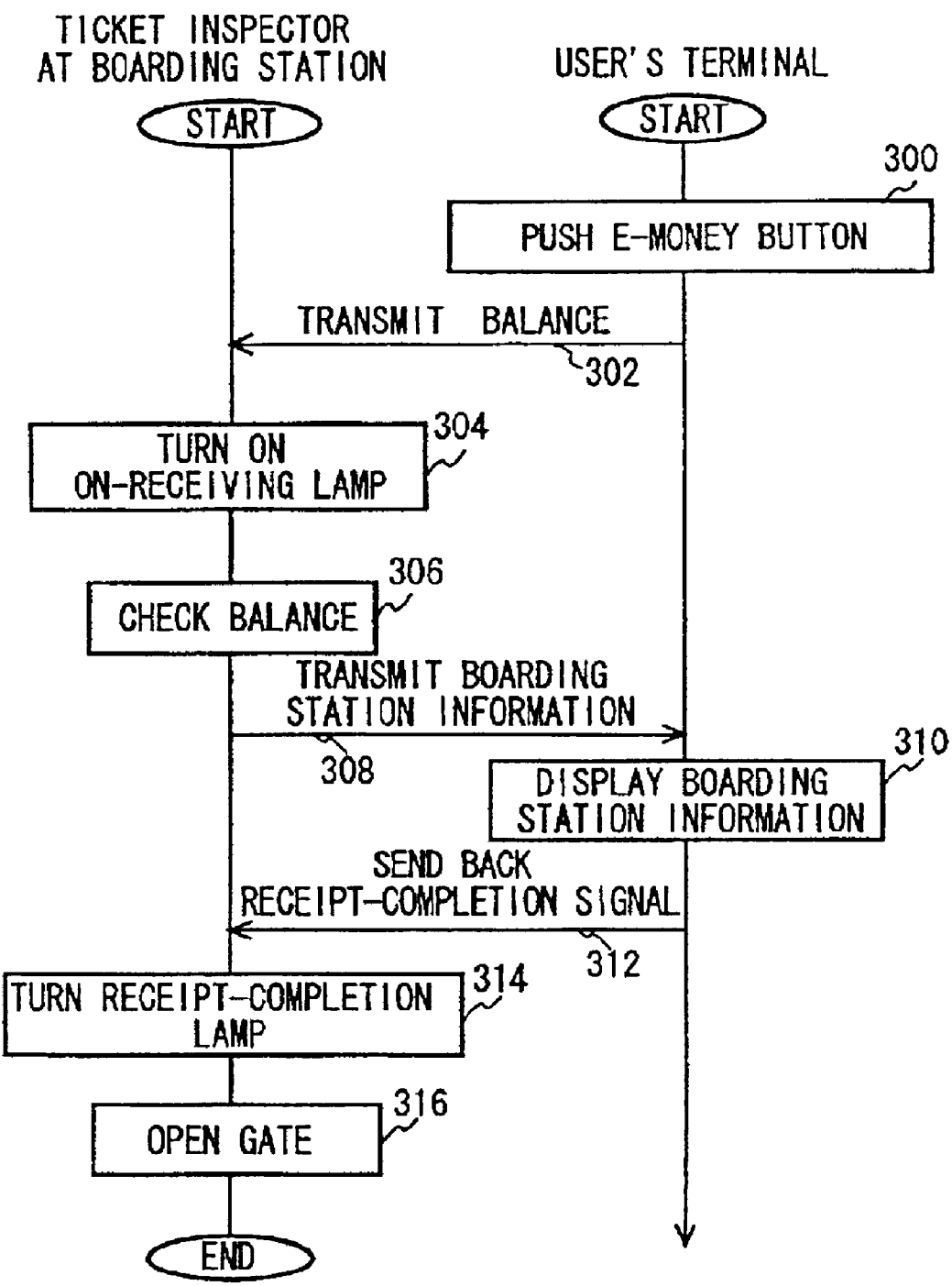
FIG. 30 is a flowchart of an electronic money payment process at a ticket gate of a boarding station according to the present invention.

FIG. 30 is a flowchart of the electronic money payment process at the ticket gate of the boarding station. The user pushes an electronic money button of the user's terminal 20 at the ticket gate of the boarding station, thereby starting wireless communication between the wireless communication port 920 of the ticket inspector 12 and the user's terminal 20 (Step 300). The user's terminal 20 transmits the balance of electronic money to the ticket inspector 12 (Step 302). The ticket inspector 12 confirms that the balance received from the user's terminal 20 is larger than the minimum fare (Step 306). In a case where the balance does not cover the minimum fare, a signal indicating the shortage of the balance is transmitted to the user's terminal 20.

A screen shown in FIG. 32B is then displayed on the user's terminal 20 but the gate does not open. In a case where the balance covers the minimum fare, the ticket inspector 12 transmits information regarding the boarding station to the user's terminal 20 (Step 308). The user's terminal 20 then displays the boarding station information by a screen shown in FIG. 32A. A train icon 932 on the display screen indicates that the user is on board the train and the payment has not been finished yet. The user's terminal 20 sends back the receipt-completion signal to the ticket inspector 12 after displaying the boarding station information (Step 312). The ticket inspector 12 turns on the receipt-completion lamp 924 (Step 314) and opens the gate (Step 316).

Figure 31:
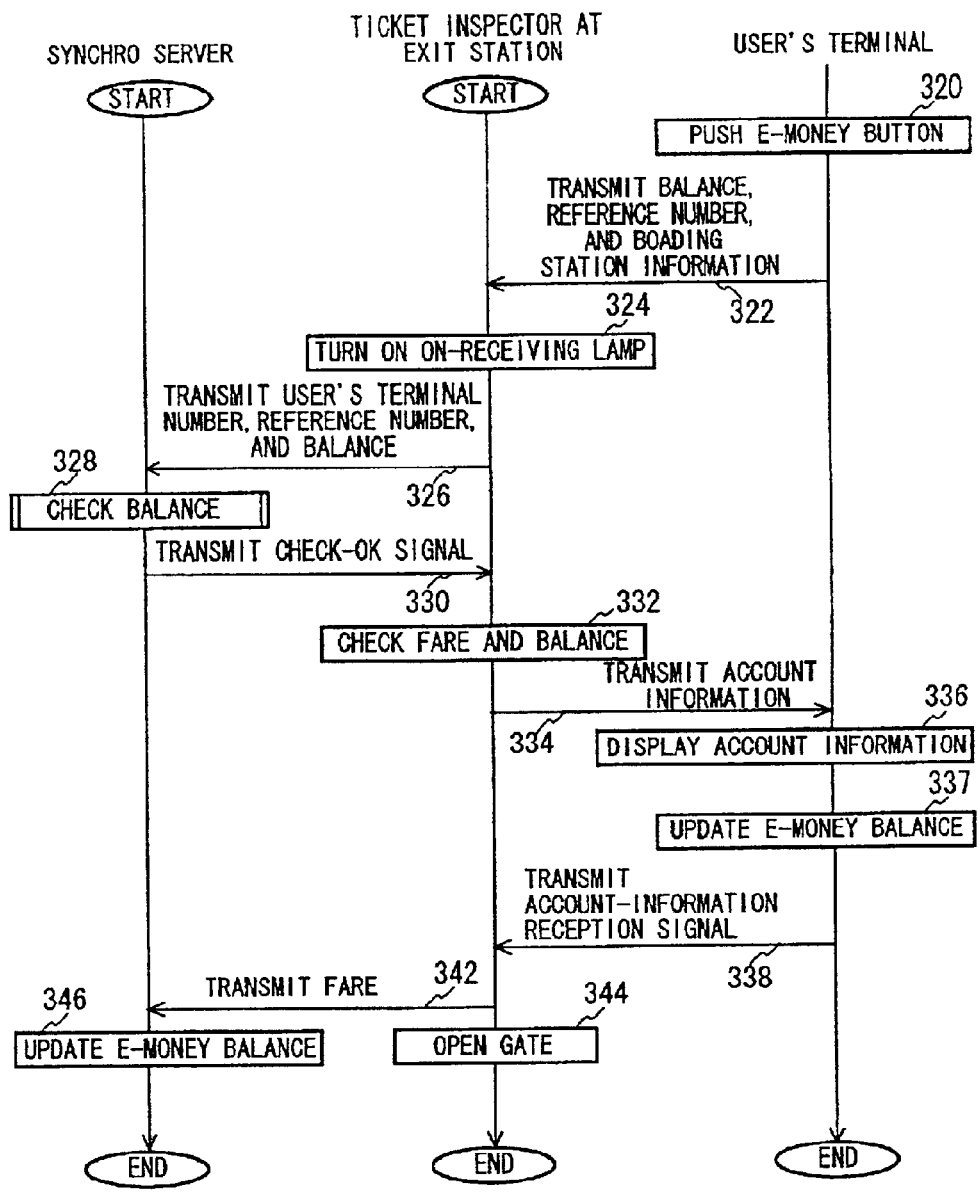
FIG. 31 is a flowchart of an electronic money payment process at a ticket gate of an exit station according to the present invention.

FIG. 31 is a flowchart of the electronic money payment process at the ticket gate of the exit station. The user pushes the electronic money button on the user's terminal 20, thereby staring communication with the wireless communication port 920 of the ticket inspector 12 (Step 320). The user's terminal 20 transmits the balance and reference number of the electronic money and the boarding station information to the ticket inspector 12 (Step 322). The ticket inspector 12 turns on the on-receiving lamp 922 (Step 324). The ticket inspector 12 transmits the user's terminal number, the reference number and the balance received from the user's terminal 20 to the synchro server 30 (Step 326). The synchro server 30 checks the balance of the electronic money (Step 328).

The process of checking the electronic money in Step 328 is the same as the process of Step 110 of checking the electronic money in the first embodiment and therefore a detailed description thereof is omitted here. In a case where the check of the electronic money was not successful, a screen shown in FIG. 32E is displayed on the user's terminal and the payment by electronic money cannot be done, so that the gate of the ticket inspector 12 does not open. In a case where the check of the electronic money was successful, the synchro server 30 transmits the check-OK signal to the ticket inspector 12 (Step 330) and confirms the spent amount and the balance (Step 332).

The ticket inspector 12 calculates the fare from the boarding station to the exit station by using the information regarding the boarding station received from the user's terminal 20, thereby calculating the spent amount. The process to check the spent amount and balance in Step 322 is the same as the process in Step 114 in the first embodiment shown in FIG. 20. In a case of shortage of the balance, a screen shown in FIG. 32F is displayed on the user's terminal 20, the payment by electronic money cannot be done, and the gate of the ticket inspector 12 does not open.

After the confirmation of the spent amount and balance, account information is sent to the user's terminal 20 (Step 334). The user's terminal 20 displays the account information received from the ticket inspector 12 by a screen shown in FIG. 32D (Step 336). On the display, the names of the boarding station and exit station, the fare from the boarding station to the exit station, and the balance of electronic money in a case of paying for the fare by electronic money are displayed.

The user's terminal 20 updates the balance of electronic money (Step 337) after displaying the account information, and then transmits an account-information receipt signal to the ticket inspector 12 (Step 338). The ticket inspector 12 sends the spent amount to the synchro server 30 (Step 342) after receiving the account-information receipt signal from the user's terminal 20, and then opens the gate (Step 344). The synchro server 30 updates the balance of electronic money stored in the deposit database 56 (Step 346) when receiving the spent amount from the ticket inspector 12.

(Embodiment 5) The electronic payment system according to a fifth embodiment of the present invention is described. In the electronic payment system of the present embodiment, the user can pay for toll of a toll road, such as a speedway, by electronic money.

Figure 33:
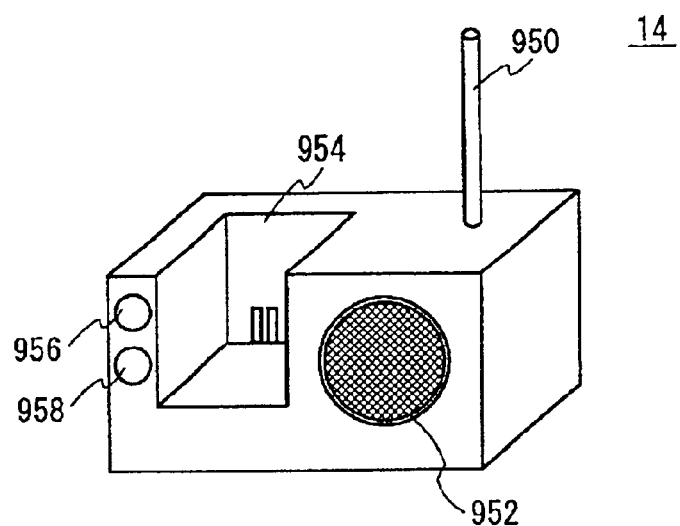
FIG. 33 shows an appearance of a communication adapter in an electronic payment system according to a fifth embodiment of the present invention.

In the electronic payment system of the present embodiment, a communication adapter to which a mobile phone is attached, as an example of the claiming terminal, is used. FIG. 33 shows an appearance of the communication adapter 14. The communication adapter 14 includes an antenna 950 for detecting an electric wave signal, a speaker 952, a hand-held device cradle 954, a toll-booth signal detection lamp 956 and a pass-OK lamp 958. The user provides the communication adapter 14 on a dashboard of a car and the like and places the user's terminal 20 on the cradle 954 to be connected to the cradle 954.

Figure 34:
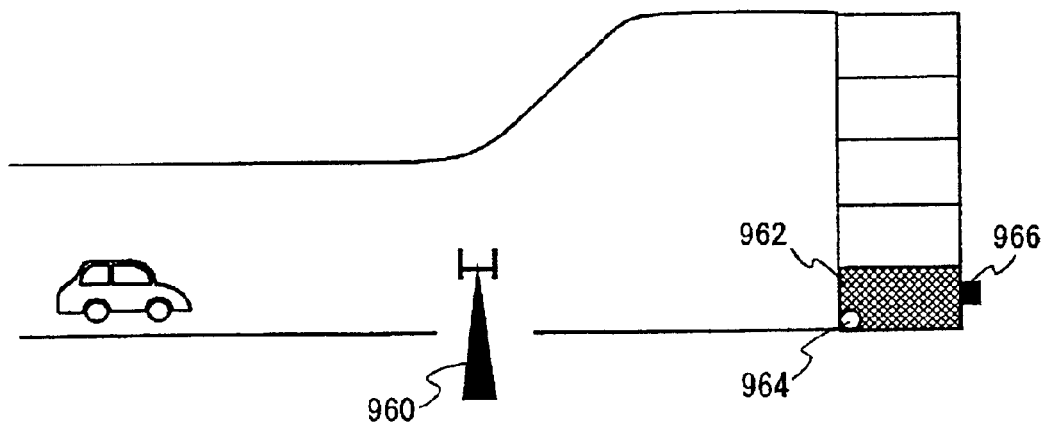
FIG. 34 shows an appearance of a tollbooth exclusive toll bar of a toll road in an electronic payment system according to the fifth embodiment of the present invention.

FIG. 34 shows an appearance of a charging system for the toll road. The toll-road charging system includes a communication tower 960 and an exclusive tollgate 962 at a toll booth. The communication tower 960 is placed before the toll booth so as to transmit the electric wave signal. The exclusive tollgate is exclusive to the payment by electronic money, and has a sensor 964 and a monitor camera 966.

When the car the user is on board approaches the communication tower 960 and reaches a point several hundred meters away from the communication tower 960, the communication adapter 14 detects the electric wave signal transmitted from the communication tower 960, by means of the antenna 950, and then automatically starts communication by the user's terminal 20, so as to transmit the user's terminal number and the reference number and balance of the electronic money from the user's terminal 20 to the communication tower 960. The electronic-money checking process performed by the communication tower 960 is the same as the electronic-money checking process by the register terminal 10 in the first embodiment, and therefore a detailed description thereof is omitted here.

While the communication tower 960 is checking the electronic money, the tollbooth-signal detection lamp 956 of the communication adapter turns on and off, thereby notifying the user that the car approaches the toll booth and the electronic money payment process is being performed. This notification to the user may be made by an audio message by means of the speaker 952.

If the check of the electronic money was successful, the communication tower 960 transmits the check-OK signal to the communication adapter 14 or the user's terminal 20. The communication adapter 14 then turns the pass-OK lamp 958 on, thereby notifying the user that the car has been permitted to pass through the exclusive tollgate 962 for the payment by electronic money at the toll booth. Moreover, the notification to the user may be simultaneously performed by an audio message by means of the speaker 952, which is one example of a sound notification unit. In this way, the user can go into the exclusive toll bar 962 without interrupting the drive.

In a case where the check of the electronic money was not successful, the communication tower 960 transmits the check-failure signal to the communication adapter 14 or the user's terminal 20. The communication adapter 14 switches the state of the tollbooth signal detection lamp 956 so that the lamp 956 is lighted, thereby notifying the user that the car cannot pass through the exclusive tollgate 962. Moreover, the notification to the user may be simultaneously made by an audio message by means of the speaker 952. In this way, the user gives up the payment by electronic money and can go into a general tollgate at the toll booth without interrupting the drive.

The communication tower 960 may compare the balance of the electronic money in the user's terminal 20 with the toll of the toll road so as to check whether or not the balance can cover the toll, and transmits a signal notifying the user of shortage of the balance to the user's terminal 20 in a case of shortage of the balance. In a case where the user's terminal 20 received the signal of shortage of the balance, the communication adapter 14 may switch the state of the tollbooth signal detection lamp 956 so that the lamp 956 is lighted, and notify the user by the audio message via the speaker 952 that the car cannot pass through the exclusive tollgate 962. In this way, the user can go into the general tollgate without interrupting the drive.

When the user's car enters the exclusive tollgate 962, the sensor 964 provided at the entrance of the exclusive tollgate 962 detects a signal from the communication adapter 14 and receives the user's terminal number of the user's terminal 20 from the communication adapter 14. The sensor 964 determines whether or not the communication adapter 14 of the user received permission to pass based on the user's terminal number, and allows the car to pass in a case where the communication adapter 14 received the passing permission.

The communication tower 960 may communicate with the exclusive tollgate 962 by wireless communication or by connection by a private line, a telephone line or the like. Thus, the exclusive tollgate 962 may receive the user's terminal number of the user's terminal 20 of the communication adapter 14 that has been permitted to pass by the communication tower 960 and check the received user's terminal number with the user's terminal number that the sensor 964 received from the communication adapter 14.

In a case where there is no communication means between the communication tower 960 and the exclusive tollgate 962, the communication tower 960 may transmit the user's terminal number of the communication adapter 14 that has been permitted to pass, to the synchro server 30 so as to make the synchro server 30 store the transmitted user's terminal number. The exclusive tollgate 962 may transmit to the synchro server 30 the user's terminal number the sensor 964 received from the communication adapter 14 so as to make the synchro server 30 check the transmitted user's terminal number with the user's terminal number that the synchro server 30 received from the communication tower 960.

When the car has passed through the gate, payment information is transmitted to the user's terminal 20 and the synchro server 30 and the balance of the electronic money stored in the deposit database 56, thereby finishing the communication.

In a case where a car with no permission to pass or a car that includes no electronic money payment apparatus has passed through the exclusive tollgate 962, the sensor 964 detects the passing with no permission and the monitor camera 966 takes a picture of a car number or the drivers face, so that the penalty or toll can be demanded later.

In the above example, the toll is constant. However, in a case where the toll is not constant but increases with the distance of the toll road on which the user drove the car, the user has to start the payment by electronic money at the tollgate on the start point of the toll road, to store the start point in the user's terminal 20, and to pay the fee in accordance with the distance by electronic money at the tollgate on an exit point of the toll road. In this case, a payment process that is similar to that in the case of the ticket inspector in the fourth embodiment can be used.

In the above example, the user's terminal 20 is attached to the communication adapter 14. However, the user's terminal 20 may have a part or all of the functions of the communication adapter 14. The user's terminal 20 may include a detection unit that detects the electric wave signal transmitted from the communication tower 960, and may start to communicate with the communication tower 960 automatically in a case where the detection unit detected the electric wave signal from the communication tower 960, so as to transmit the user's terminal number and the reference number and balance of the electronic money to the communication tower 960.

In the above example, the communication tower 960 checks the electronic money and the balance and gives the user's car the permission to pass; the exclusive tollgate 962 of the toll booth allows the user's car to which the permission has been given to pass; and the synchro server 30 updates the balance of the electronic money of the user who passed through the exclusive tollgate 962. However, the embodiment of the charging system is not limited thereto. The exclusive tollgate 962 of the toll booth may perform a part of the functions of the communication tower 960. For example, the exclusive tollgate 962 may communicate with the user's terminal 20 so as to check the electronic money and confirm the balance.

In the fourth and fifth embodiments, the payment cannot be cancelled when the user confirms the paying amount, unlike the first embodiment. Instead, in the fourth and fifth embodiments, the accounting information is displayed on the user's terminal 20 and, immediately after this, the balance of electronic money is updated. In particular, in a case where the car passes through the expressway toll booth, when the payment is cancelled, the car cannot pass through the tollgate of the toll booth, causing some troubles. Thus, the cancel of the payment by the user is not preferable. In such a case, only the confirming process of the account information is performed and thereafter the payment process has to be made to progress.

However, it is necessary to enable the user to contact the management center when the toll is wrong, so that the management center can deal with this fact later. Thus, it is desirable that the synchro server 30 record the logs of the user of electronic money in detail. Although only the information indicating the spent amount of the electronic money is sent from the ticket inspector 12 or the communication adapter 14 to the synchro server 30 in the flowchart of the payment by electronic money, information such as the date and time at which the user used electronic money, the name of the station, the name of the tollbooth may be sent in addition to the information indicating the spent amount so that the synchro server 30 records the history of the use of electronic money for the user. In this way, when the user contacts the management center with a complaint later, the management center can check the use history.

Figure 35:
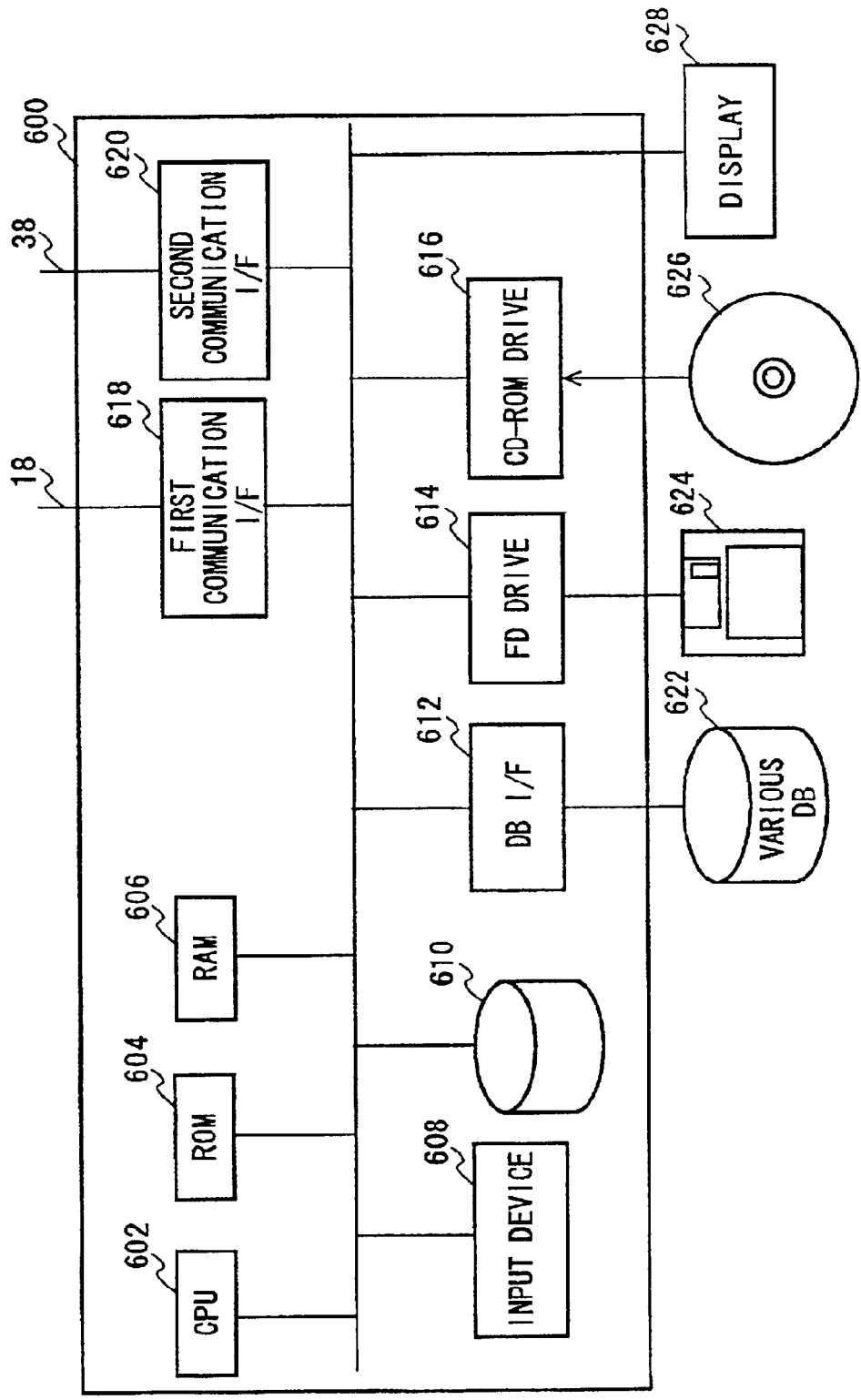
FIG. 35 shows a hardware configuration of a general computer 600 according to the present invention.

(Embodiment 6) The synchro server 30 as an example of the payment apparatus in the electronic payment system of the first, second, third, fourth and fifth embodiments may be implemented by a general computer. FIG. 35 is a block diagram showing an exemplary hardware configuration of the general computer 600. In the computer 600 shown in FIG. 35, a CPU 602 operates based on at least one program stored in ROM 604 and RAM 606. Via an input device 608, an administrator of the synchro server 30 can input data and commands. A hard disk drive 610 as an example of a storage device stores setting information and the program for the operation of the CPU 602.

A floppy disk drive 614 reads data or program from a floppy disk 624 to provide the read data or program to the CPU 602. A CD-ROM drive 616 reads data or program from a CD-ROM 626 to provide the read data or program to the CPU 602. The first communication interface 618 performs data transmission/receiving while being connected to the communication line 18. The second communication interface 620 performs data transmission/receiving while being connected to the communication line 38.

A database interface 612 can be connected to various types of database 622 to perform data transmission and data receiving therewith. Moreover, the synchro server 30 has an interface for connecting the synchro server 30 to a display 628. The administrator can monitor the operation status of the synchro server 30 and confirm the setting information of the synchro server 30 by means of the display 628.

The software executed by the CPU 602 is provided to the user while being stored in a recording medium such as the floppy disk 624 or the CD-ROM 626. The software stored in the recording medium may be compressed or not-compressed. The software is installed from the recording medium into the hard disk drive 610 and is then read onto the RAM 606, so that the CPU 602 executes the software.

The program provided while being stored in the recording medium, that is the program to be installed into the hard disk drive 610, functionally includes a storing module, an operation module, a payment processing module, the first communication module, the second communication module, and a database retrieving module.

The processes that are to be performed by the CPU 602 in accordance with instructions to the computer 600 from the storing module, the operation module, the payment processing module, the first communication module, the second communication module and the database retrieving module are the same as the functions and operations of the memory unit 80, the operation unit 81, the payment processing unit 82, the first communication unit 84, the second communication unit 86 and the database retrieving unit 88 in the synchro server 30 in the first, second, third, fourth and fifth embodiments, respectively, and therefore a detailed description thereof is omitted here.

A part or all of the functions and operations of the synchro server 30 as an example of the payment apparatus according to all the embodiment described in the present application can be stored in the floppy disk 624 or the CD-ROM 626 as an example of the recording medium shown in FIG. 35. Moreover, in a case where a part of the operations of the register terminal 10 described in the above embodiments is performed by the synchro server 30 in place of the register terminal 10, the part of the operations of the register terminal 10 can also be stored in the floppy disk 624 or the D-ROM 626.

These programs may be read directly into the RAM from the recording medium so as to be executed, or read into the RAM after being installed into the hard disk drive from the recording medium, so as to be executed. Moreover, the above-mentioned programs may be stored in a single recording medium or a plurality of recording media. Furthermore, the programs may be stored while being encoded.

As the recording medium, other than the floppy disk and the CD-ROM, an optical recording medium such as a DVD or a PD, a magneto-optical recording medium such as an MD, a tape-like medium, a magnetic recording medium, or a semiconductor memory such as an IC card or a miniature card can be used. Moreover, a storage device such as a hard disk or a RAM provided in a server system connected to an exclusive communication network or the Internet may be used as the recording medium, so that the program can be provided to the synchro server 30 through a communication network. Such a recording medium is used only for manufacturing the synchro server 30 and it is therefore apparent that the manufacture, sale and the like, of such a recording medium on business constitute infringement of a right based on the present application.

As described above, according to the electronic payment system of the present invention, a user can store electronic money in a hand-held terminal and can make payments by electronic money with safety and convenience in various situations, for example, at the retail store, at a place where a vending machine is provided, at the parking fee collecting machine, at the railway ticket inspector, or at the toll booth of a toll road.

The electronic payment system of the present invention provides the user with the following advantages. The user can make payment by electronic money anywhere and anytime the user buys something by carrying with the user a mobile phone, that is a communication device excellent in portability. Thus, it is unnecessary to carry cash, a credit card, a cash-card, an IC-money card or the like. Moreover, the user can confirm the status of direct debit or available balance of the user's account, shopping history or the like by using a data packet communication function of the mobile phone.

In addition, the electronic payment system provides the retail store with the following advantage. The burden on the clerk who operates the register can be reduced because the payment can be made safely and conveniently by electronic money stored in the mobile phone without inquiry of the card number to the credit card company, like in the case of a credit-card payment. Moreover, no dedicated reader for the credit card or an IC card that stores electronic money is required, thus reducing the cost of placing such a reader.

Furthermore, the electronic payment system of the present invention provides the credit card company with the following advantage. The electronic payment system using the mobile phone with high security can ensure that electronic money is withdrawn from the credit card account, thus preventing unfair use of the withdrawn electronic money. Moreover, the use of electronic money can make issue and management of the credit cart unnecessary, so that the cost can be reduced.

As is apparent from the above, according to the present invention, payment on the dealings of goods can be made safely and conveniently by using electronic money.

Although the present invention has been described by way of exemplary embodiments, it should be understood that those skilled in the art might make many changes and substitutions without departing from the spirit and the scope of the present invention which is defined only by the appended claims.

What is claimed is:

1. An electronic payment system for making payment on a dealing by electronic money, comprising:

a payment terminal operable to store a first reference number for electronic money for making payment on said dealing by said electronic money;

a demanding terminal operable to communicate with said payment terminal to demand said payment; and a payment apparatus operable to communicate with said demanding terminal and to store a second reference number to correspond to an identification number of said payment terminal for allowing settlement of said payment on said dealing, wherein said payment apparatus updates said second reference number in accordance with a predetermined update rule, said payment terminal receives said update rule of said second reference number from said payment apparatus and updates said first reference number in accordance with said update rule, and in a case where said demanding terminal received from said payment terminal said first reference number stored in said payment terminal and then transmitted said first reference number to said payment apparatus, said payment apparatus checks said first reference number, received from said demanding terminal, with said second reference number stored in said payment apparatus to detect unfair use of said electronic money.

2. A payment apparatus that communicates with a payment terminal and a demanding terminal to make settlement on an electronic money payment for a dealing, the payment terminal being operable to store an electronic money balance for making payment on the dealing by the electronic money, the demanding terminal being operable to demand the payment on the dealing, the payment apparatus comprising:

a memory unit operable to store a check balance of said electronic money to correspond to an identification number of said payment terminal;

a communication unit operable to receive, from said demanding terminal, a payment amount of said electronic money to be paid by said payment terminal; and a processor operable to update said check balance of said electronic money stored in said memory unit based on said payment amount received from said demanding terminal, wherein, in a case where said communication unit received from said payment terminal a deposit-requested amount of said electronic money, said processor updates said check balance stored in said memory unit based on said deposit-requested amount, and said communication unit transmits a new balance, obtained by said update, to said payment terminal, wherein said communication unit receives the electronic money balance for making payment on the dealing, when said deposit-requested amount of said electronic money is received from said payment terminal, and said processor compares said electronic money balance said communication unit received from said payment terminal with said check balance stored in said memory unit, transmits said new balance to said communication unit when said compared balances coincide, and notifies a manager of said payment apparatus of a warning indicating a possibility of unfair use when said compared balances to do coincide.

3. A payment apparatus that communicates with a payment terminal and a demanding terminal to make settlement on an electronic money payment for a dealing, the payment terminal being operable to store an electronic money balance for making payment on the dealing by the electronic money, the demanding terminal being operable to demand the payment on the dealing, the payment apparatus comprising:

a memory unit operable to store a check balance of said electronic money to correspond to an identification number of said payment terminal;

a communication unit operable to receive, from said demanding terminal, a payment amount of said electronic money to be paid by said payment terminal; and a processor operable to update said check balance of said electronic money stored in said memory unit based on said payment amount received from said demanding terminal, wherein said communication unit receives from said demanding terminal the electronic money balance for making payment on the dealing, which is notified from said payment terminal, when said communication unit receives, from said demanding terminal, said payment amount to be paid by said payment terminal, and said processor compares said electronic money balance said communication unit received from said demanding terminal with said check balance stored in said memory unit, updates said check balance stored in said memory unit when said compared balances coincide, and notifies a manager of said payment apparatus of a warning indicating a possibility of unfair use when said compared balances do not coincide.

4. A payment apparatus that communicates with a payment terminal and a demanding terminal to make settlement on an electronic money payment for a dealing, the payment terminal being operable to store a check reference number for the electronic money for making payment on the dealing, the demanding terminal being operable to demand the payment on the dealing, the payment apparatus comprising:

a memory unit operable to store a reference number of said electronic money to correspond to an identification number of said payment terminal;

an operation unit operable to update said reference number in accordance with a predetermined update rule;

a communication unit operable to receive, from said demanding terminal, said check reference number of said electronic money, which said demanding terminal was notified from said payment terminal; and a processor operable to compare said reference number stored in said memory unit with said check reference number received from said demanding terminal to validate said electronic money.

5. The payment apparatus as claimed in claim 4, wherein, in a case where said communication unit received a deposit request for said electronic money from said payment terminal, said communication unit transmits said update rule for updating said reference number to said payment terminal.

6. The payment apparatus as claimed in claim 5, wherein said update rule uniquely determines said reference number based on an initial value and time information to provide different reference numbers for different initial values or different time information.

7. The payment apparatus as claimed in claim 6, wherein said time information is a time that has passed after a start time at which said communication unit transmitted said update rule to said payment terminal.

8. The payment apparatus as claimed in claim 7, wherein said initial value is an irrational number, and said update rule selects a number at a decimal place of said irrational number as said reference number, said decimal place being determined based on said time information.

9. The payment apparatus as claimed in claim 5, wherein said memory unit stores a number corresponding to the number of times said payment terminal performed dealings using said electronic money, said number being stored to correspond to said identification number of said payment terminal, and said update rule uniquely determines said reference number based on an initial number and said number of times said payment terminal performed dealings in such a manner that said reference number is different when said initial value or said number of times is changed.

10. The payment apparatus as claimed in claim 5, wherein said memory unit stores a term of validity of said electronic money, and in a case where said term of validity has expired, said operation unit changes said update rule, said communication unit transmits said changed update rule to said payment terminal, and said processor updates said term of validity stored in said memory unit.

11. A recording medium storing a computer program that enables communication with a payment terminal and a demanding terminal for making settlement on an electronic money payment for a dealing, the payment terminal being operable to store an electronic money balance for making payment on the dealing, the demanding terminal being operable to demand the payment on the dealing, the program comprising:

a storing module that enables a computer to store a check balance of said electronic money to correspond to an identification number of said payment terminal;

a communication module that enables the computer to receive, from said demanding terminal, a payment amount of said electronic money to be paid by said payment terminal; and a processing module that enables the computer to update said check balance of said electronic money based on said payment amount received from said demanding terminal, wherein said communication module enables the computer to receive the electronic money balance from said payment terminal when receiving a deposit-requested amount of said electronic money from said payment terminal, and said processing module enables the computer to compare said electronic money balance received from said payment terminal with said check balance, transmit a new balance obtained by said update when said compared balances coincide, and notify a manager of the computer of a warning indicating a possibility of unfair use of said electronic money.

12. A recording medium storing a computer program for enabling communication with a payment terminal and a demanding terminal to make settlement on an electronic money dealing, the payment terminal being operable to store a check reference number of electronic money for making payment on the dealing by the electronic money, the demanding terminal being operable to demand the payment on the dealing, the program comprising:

a storing module that instructs a computer to store a reference number of said electronic money to correspond to an identification number of said payment terminal;

an operation module that instructs said computer to update said stored reference number in accordance with a predetermined update rule;

a communication module that instructs said computer to receive from said demanding terminal said check reference number of said electronic money, which said demanding terminal was notified from said payment terminal; and a processing module that instructs said computer to compare said stored reference number with said check reference number received from said demanding terminal to validate said electronic money, wherein said update rule uniquely determines said stored reference number based on an initial value and time information in such a manner that said stored reference number is changed when said initial value or said time information is changed.

13. A payment terminal for communication with a payment apparatus, which is operable to store a balance of electronic money for making settlement on a dealing by the electronic money, and a demanding terminal, which is operable to demand the payment on the dealing, the payment terminal, which makes the electronic money payment on the dealing, comprising:

a first communication unit operable to communicate with said payment apparatus and to receive, from said payment apparatus, said balance of said electronic money stored in said payment apparatus;

a memory unit operable to store said balance of said electronic money received by said first communication unit;

a second communication unit operable to communicate with said demanding terminal and to receive a payment amount of said electronic money from demanding terminal; and a processor operable to update said balance of said electronic money stored in said memory unit based on said payment amount, wherein said first communication unit communicates with said payment apparatus by wireless telecommunication, and said second communication unit communicates with said demanding terminal by optical communication or short-distance wireless communication to send an identification number for identifying said payment terminal to said demanding terminal.

14. A payment terminal that communicates with a payment apparatus and a demanding terminal to make payment on a dealing using electronic money, the payment apparatus stores a reference number of the electronic money for making settlement on the dealing by electronic money, the demanding terminal demands the payment on the dealing, the payment terminal comprising:
- a memory unit operable to store a check reference number of said electronic money;
- a first communication unit operable to communicate with said payment apparatus and to receive from said payment apparatus an update rule for updating said check reference number stored in said memory unit;
- an operation unit operable to update said check reference number stored in said memory unit in accordance with said update rule; and
- a second communication unit operable to communicate with said demanding terminal and to send said check reference number, after being updated by said operation unit, to said demanding terminal.

15. The payment terminal as claimed in claim 14, wherein said first communication unit receives from said payment apparatus said update rule for updating said check reference number in a case where a deposit-requested amount of said electronic money is sent to said payment apparatus.

16. The payment terminal as claimed in claim 15, wherein said update rule uniquely determines said check reference number based on an initial value and time information in such a manner that said check reference number is changed when said initial value or time information is changed.

17. The payment terminal as claimed in claim 16, wherein said time information is a time period that has passed after a time at which said update rule was received by said first communication unit.

18. The payment terminal as claimed in claim 17, wherein said initial value is an irrational number, and said update rule selects a number at a decimal place of said irrational number as said check reference number, said decimal place being determined based on said time information.

19. The payment terminal as claimed in claim 15, wherein said memory unit stores a number of times that dealings using electronic money were performed, and
- said update rule uniquely determines said check reference number based on an initial value and said number of times that dealings were performed in such a manner that said check reference number is changed when said initial value or said number of times is changed.

20. The payment terminal as claimed in claim 14, wherein said memory unit stores a term of validity of said electronic money, and
- in a case where said term of validity has expired, said first communication unit sends a change request for said update rule to said payment apparatus and receives a changed update rule from said payment apparatus, while said operation unit updates said term of validity stored in said memory unit.

21. The payment terminal as claimed in claim 14, wherein said first communication unit communicates with said payment apparatus by wireless telecommunication, and
- said second communication unit communicates with said demanding terminal by optical communication or short-distance wireless communication to send an identification number for identifying said payment terminal to said demanding terminal.

22. The payment terminal as claimed in claim 14, wherein said second communication unit receives from said demanding terminal start point information regarding a start point at which a user of said payment terminal starts to use said electronic money,
- said memory unit stores said start point information, and
- said second communication unit sends said start point information to said demanding terminal so that said payment amount is calculated based on a distance moved by said user from said start point, in a case where said user finishes using said electronic money.

23. A payment terminal for communication with a payment apparatus, which is operable to store a balance of electronic money for making settlement on a dealing by the electronic money, and a demanding terminal, which is operable to demand the payment on the dealing, the payment terminal, which makes the electronic money payment on the dealing, comprising:
- a first communication unit operable to communicate with said payment apparatus and to receive, from said payment apparatus, said balance of said electronic money stored in said payment apparatus;
- a memory unit operable to store said balance of said electronic money received by said first communication unit;
- a second communication unit operable to communicate with said demanding terminal and to receive a payment amount of said electronic money from demanding terminal; and
- a processor operable to update said balance of said electronic money stored in said memory unit based on said payment amount,
- wherein said second communication unit receives from said demanding terminal start point information regarding a start point at which a user of said payment terminal starts to use said electronic money,
- wherein said memory unit stores said start point information, and
- wherein said second communication unit sends said start point information to said demanding terminal so that said payment amount is calculated based on a distance moved by said user from said start point, in a case where said user finishes using said electronic money.

* * * * *